United States Patent
Wang et al.

(10) Patent No.: US 7,657,880 B2
(45) Date of Patent: Feb. 2, 2010

(54) SAFE STORE FOR SPECULATIVE HELPER THREADS

(75) Inventors: Hong Wang, San Jose, CA (US); Tor Aamodt, Santa Clara, CA (US); Per Hammarlund, Hillsboro, OR (US); John Shen, San Jose, CA (US); Xinmin Tian, San Jose, CA (US); Milind Girkar, Sunnyvale, CA (US); Perry Wang, San Jose, CA (US); Steve Shih-wei Liao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 10/633,012

(22) Filed: Aug. 1, 2003

(65) Prior Publication Data

US 2004/0154012 A1 Aug. 5, 2004

Related U.S. Application Data

(63) Continuation-in-part of application No. 10/423,633, filed on Apr. 24, 2003, which is a continuation-in-part of application No. 10/356,435, filed on Jan. 31, 2003.

(51) Int. Cl.
*G06F 9/26* (2006.01)
*G06F 15/76* (2006.01)
*G06F 9/30* (2006.01)
*G06F 9/45* (2006.01)

(52) U.S. Cl. .................. 717/149; 711/213; 712/21; 712/203; 717/150; 717/161

(58) Field of Classification Search ................ 717/140, 717/149, 151, 162
See application file for complete search history.

(56) References Cited

U.S. PATENT DOCUMENTS

| | | | | |
|---|---|---|---|---|
| 6,574,725 | B1 * | 6/2003 | Kranich et al. | 712/31 |
| 6,615,333 | B1 * | 9/2003 | Hoogerbrugge et al. | 711/169 |
| 6,711,671 | B1 * | 3/2004 | Undy et al. | 712/225 |
| 7,185,338 | B2 * | 2/2007 | Chamdani et al. | 718/102 |
| 7,216,202 | B1 * | 5/2007 | Chaudhry et al. | 711/122 |
| 2001/0037434 | A1 * | 11/2001 | Hughes et al. | 711/146 |
| 2003/0074653 | A1 * | 4/2003 | Ju et al. | 717/154 |
| 2004/0054990 | A1 * | 3/2004 | Liao et al. | 717/124 |
| 2004/0073906 | A1 * | 4/2004 | Chamdani et al. | 718/102 |

* cited by examiner

*Primary Examiner*—Eric B Kiss
*Assistant Examiner*—Isaac T Tecklu
(74) *Attorney, Agent, or Firm*—David P. McAbee

(57) ABSTRACT

The latencies associated with retrieving instruction information for a main thread are decreased through the use of a simultaneous helper thread. The helper thread is permitted to execute Store instructions. Store blocker logic operates to prevent data associated with a Store instruction in a helper thread from being committed to memory. Dependence blocker logic operates to prevent data associated with a Store instruction in a speculative helper thread from being bypassed to a Load instruction in a non-speculative thread.

30 Claims, 12 Drawing Sheets

SAFE STORE FOR SPECULATIVE HELPER THREADS

RELATED APPLICATIONS

The present patent application is a continuation-in-part of prior U.S. patent application Ser. No. 10/423,633 filed on Apr. 24, 2003, entitled "Speculative Multi-Threading For Instruction Prefetch And/Or Trace Pre-Build," which is a continuation-in-part of prior U.S. patent application Ser. No. 10/356,435, filed on Jan. 31, 2003, entitled "Control-Quasi-Independent-Points Guided Speculative Multithreading."

BACKGROUND

1. Technical Field

The present disclosure relates generally to information processing systems and, more specifically, to handling of Store instructions and dependencies during speculative pre-execution of a helper thread.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance through additional transistors, other performance enhancements involve software techniques. One software approach that has been employed to improve processor performance is known as "multithreading." In software multithreading, an instruction stream is split into multiple instruction streams that can be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoeMT"), only one thread, at most, is active at a given time.

Increasingly, multithreading is supported in hardware. For instance, in one approach, processors in a multi-processor system, such as a chip multiprocessor ("CMP") system, may each act on one of the multiple threads simultaneously. In another approach, referred to as simultaneous multithreading ("SMT"), a single physical processor is made to appear as multiple logical processors to operating systems and user programs. In SMT, multiple threads can be active and execute simultaneously on a single processor without switching. That is, each logical processor maintains a complete set of the architecture state, but many other resources of the physical processor, such as caches, execution units, branch predictors control logic and buses are shared. The instructions from multiple threads execute simultaneously and may make better use of shared resources than TMUX multithreading or switch-on-event multithreading. Various hybrid forms of these approaches are also possible. For example, in a CMP processor, each processor core can be multithreaded, either SoeMT or SMT.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of an apparatus and methods for handling Store instructions in a speculative helper thread.

DETAILED DESCRIPTION

Figure 1:
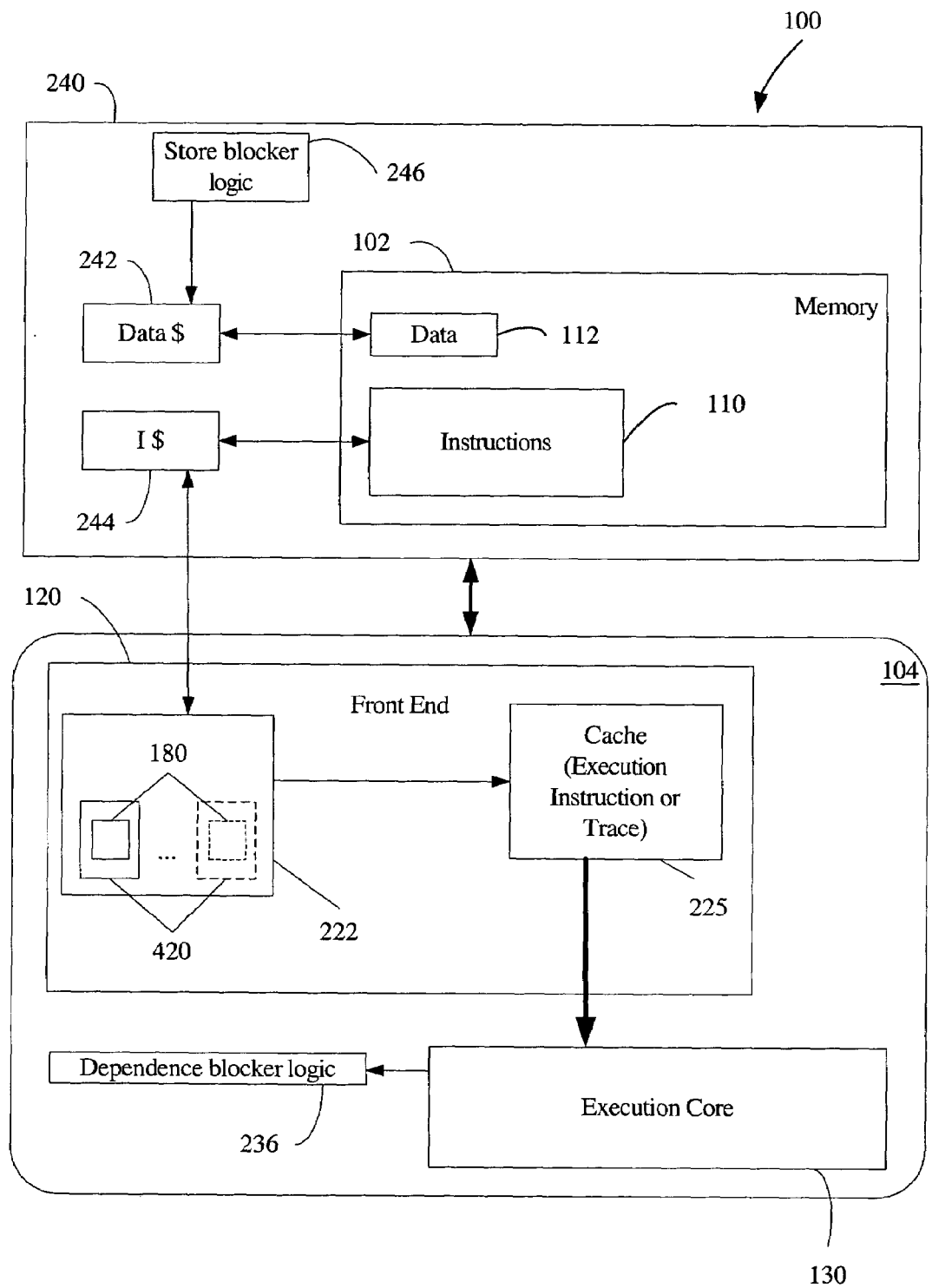
FIG. 1 is a block diagram of at least one embodiment of a processing system that may utilize disclosed techniques.

Described herein are selected embodiments of an apparatus and methods related to handling Store instructions in speculative helper threads. Even in processors that utilize multithreading to increase performance, a performance penalty is paid during the latency period associated with fetching of instructions or data.

The hardware that supports multithreading is, at times, not utilized and remains idle. During such times, idle multithreading hardware may be utilized to pre-fetch data or execution instruction information (assuming that the execution path for the main thread can be accurately determined). If speculative helper threads are utilized to pre-fetch instructions or data, data associated with a speculatively executed Store instruction may cause incorrect execution of the main thread if the data is committed to memory or bypassed to the non-speculative thread. Embodiments of the method and apparatus disclosed herein address this and other concerns related to processing Store instructions in speculatively pre-executed helper threads.

In the following description, numerous specific details such as processor types, multithreading environments, spawning pair selection methods, management methods for out-of-order execution of Store instructions, and cache management methodology have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

At least some embodiments of the apparatus discussed herein include a mechanism to mark instructions from a speculative helper thread as being "speculative," and also include dependence blocker logic to prevent bypass of speculative Store data to a non-speculative Load instruction. At least some embodiments of the apparatus also include store blocker logic to prevent the commission of speculative Store data to memory.

At least some embodiments of the apparatus use dedicated instruction encoding, such as new instructions or new instruction hints, for the store or load operations in a speculative thread. Store instructions thus encoded may explicitly indicate the store operation as a "safe store" that is subject to the store blocker logic. Similarly, load instructions thus encoded may explicitly mark the load operation as a load from a speculative thread that is thus subject to the dependence blocker logic (e.g., such load instruction may consume data produced by a safe store during the speculative thread execution).

As is mentioned above, a major consideration for speculative multithreading techniques is whether and how to handle Store instructions (by which, in this draft, we specifically mean those Store instructions that can potentially update a non-speculative thread's architectural memory state) in a speculative thread. Traditionally, rather extreme approaches have been adopted for each of two typical speculative multithreading situations. These two situations are distinguished by the use, or not, of the architectural state computed by the speculative thread.

First, in some instances the architectural states generated by the speculative thread are to be re-used by the non-speculative thread. For these situations, referred to herein as "category 1 techniques", relatively complicated hardware mechanisms are usually employed to buffer different versions of speculatively written memory states. In addition, relatively sophisticated checker logic is employed to determine the success of speculation and if the speculatively-generated Store data should be re-used (if speculation is successful), or whether speculation should be rolled back (if speculation is not successful). Accordingly, support for speculative Store instructions is achieved in category 1 techniques, but at a relatively high cost in terms of hardware complexity. While optimization of category 1 techniques may be desirable, the embodiments discussed below generally are not geared toward category 1 techniques but are instead intended to address the second speculative multithreading situation discussed immediately below.

A second speculative threading situation involves the case of speculative helper threading, where the architectural states generated by the speculative thread are not to be re-used by the non-speculative thread. Instead, the non-speculative thread reuses the effects of the execution of the helper thread on the microarchitectural states (such as cache warm-up). Traditionally, in such approaches, referred to herein as "category 2 techniques", Store instructions operating on the non-speculative thread's architectural memory states are explicitly avoided in the speculative helper thread. Accordingly, no additional hardware support is required to handle Store instructions in the speculative helper thread for category 2 techniques. For example, speculative precomputation techniques may be employed such that a helper thread performs data prefetch and thus warms up the data cache for the non-speculative thread. An example of this approach, for instance, is disclosed in co-pending U.S. patent application Ser. No. 10/245,548, "Post-pass Binary Adaptation for Software-Based Speculative Pre-Computation." In such approach, Store instructions on the non-speculative thread's architectural memory states may be specifically excluded from the "slice" (or subset) of instructions executed by the speculative helper thread.

In certain instances, the benefit of traditional category 2 techniques may be tempered by the inherent limitations of such techniques. Admittedly, hardware complexity is reduced when Store instructions are not performed by speculative helper threads (thus prohibiting them from updating non-speculative thread's architectural memory states). However, the restriction against including Store instructions in the speculative thread can potentially limit applicability of the approach. A prohibition against performing Store instructions may result in the helper thread being unable to accurately calculate addresses in the prefetch context. Two examples of potentially inaccurate address calculation during executing of prefetching helper threads, where traditional category 2 techniques prohibit execution of Store instructions in a helper thread context, include 1) tracking the run-time mutation of dynamic data structures and 2) tracking control flow for instruction pre-fetch. A failure to execute Store instructions in a speculative helper thread for data prefetch may inhibit the ability of the helper thread to correctly track run-time mutations of dynamic data structures where Store instructions are used to update memory pointers to the relevant data structures. Similarly, inhibiting Store instructions in a helper thread for instruction prefetch may likewise inhibit the ability of the helper thread to accurately track control flow for instruction prefetch. Each of these two situations could benefit from execution of Store instructions in a helper thread; each is discussed in further detail below.

FIG. 1 is a block diagram illustrating at least one embodiment of a computing system 100 capable of performing the disclosed techniques to allow store-to-load memory dependencies to be honored during speculative execution in a helper thread, without incurring the hardware complexity associated with category 1 techniques. The computing system 100 includes a processor 104 and a memory 102. Memory 102 may store instructions 110 and data 112 for controlling the operation of the processor 104.

The processor 104 may include a front end 120 that supplies instruction information to an execution core 130, and may also include dependence blocker logic 236 that prevents bypass of Store data from a speculative helper thread to load instructions in non-speculative thread(s). For at least one embodiment, the front end 120 prefetches instructions that are likely to be executed. A branch prediction unit (not shown) may supply branch prediction information in order to help the front end 120 determine which instructions are likely to be executed. The front end 120 may supply the instruction information to the processor core 104 in program order.

For at least one embodiment, the front end 120 includes a fetch/decode unit 222 that includes logically independent sequencers 420 for each of one or more thread contexts (also called logical processors). The logically independent sequencer(s) 420 may include marking logic 180 to mark the instruction information for speculative threads as being "speculative." If the safe store operation is explicitly encoded as a distinct instruction or instruction hint, then the marking logic 180 may exist as an integral part of decoder 222.

For a single-processor multithreading environment, such as a simultaneous multithreading environment, a single physical fetch/decode unit 222 includes a plurality of logically independent sequencers 420 each corresponding to a thread context. However, one skilled in the art will recognize that, for an embodiment implemented in a multiprocessor multithreading (i.e. CMP) environment, in each processor core, only one sequencer 420 may be included in the fetch/decode unit 222.

Figure 12:
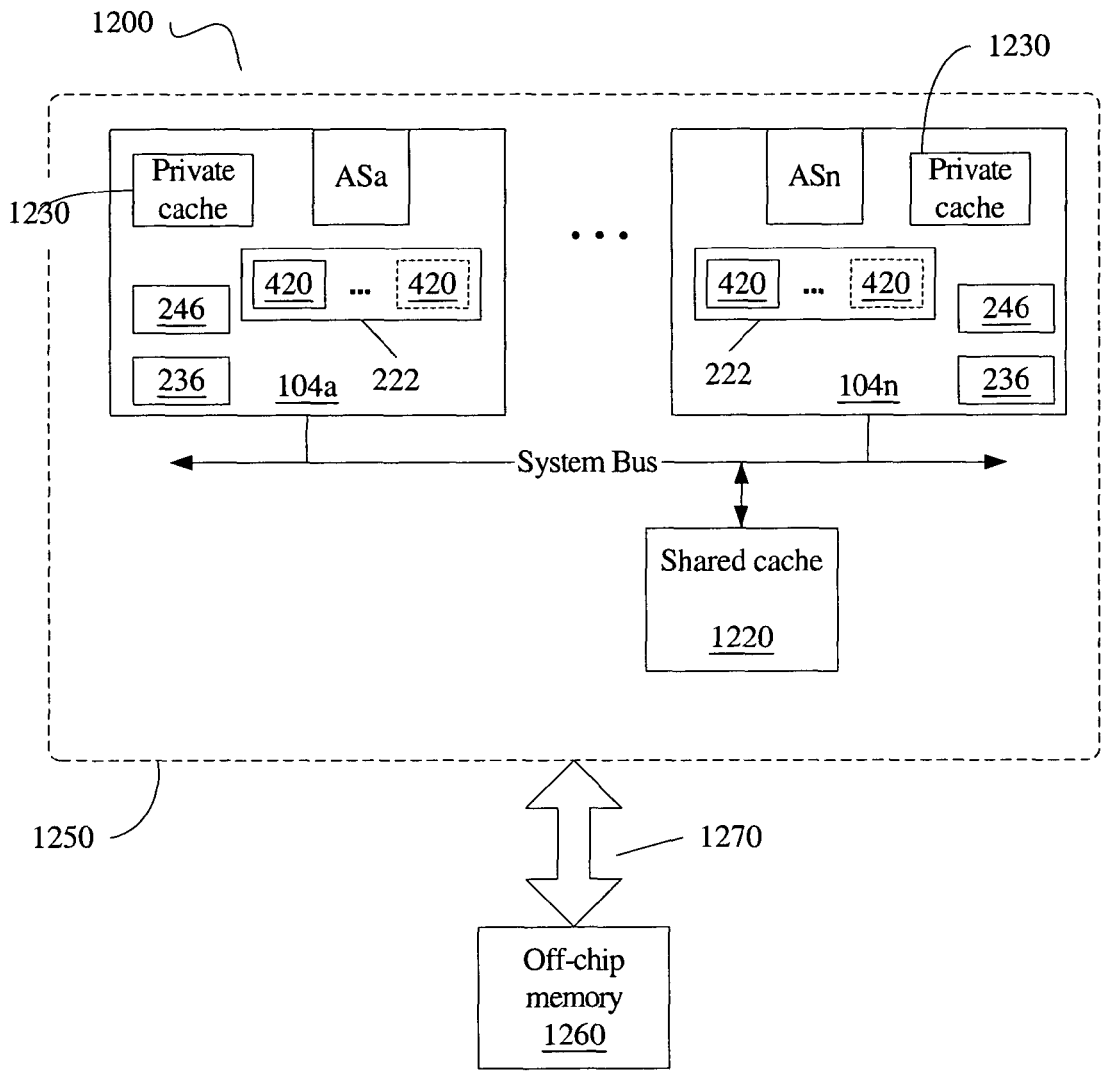
FIG. 12 is a block diagram representing an illustrative multiprocessor system capable of utilizing disclosed techniques.

Brief reference to FIG. 12 reveals selected hardware features of a multiprocessor multithreading system 1200. The system 1200 includes two or more separate physical processors 104a-104n that is each capable of executing a different thread such that execution of at least portions of the different threads may be executing concurrently. Each processor 104 includes a physically independent fetch unit 222 to fetch instruction information for its respective thread. In an embodiment where each processor 104a-104n executes a single thread, the fetch/decode unit 222 implements a single sequencer 420. However, in an embodiment where each processor 104a-104n supports multiple thread contexts, the fetch/decode unit 222 implements a distinct logical sequencer 420 for each supported thread context. The optional nature of additional sequencer(s) 420 and associated marking logic 180 in a multiple processor multithreading system is denoted by dotted lines in FIG. 12.

FIG. 12 further illustrates that the chip multiple processors (CMP) 104a through 104n each includes a private cache 1230 and also share a cache 1220 so that a speculative thread running on one processor 104a-104n can perform prefetching for a non-speculative thread running on a different processor 104a-104n. FIG. 12 illustrates that each processor 104a-104n of the multiprocessor system 1200 may further include dependence blocker logic 236 and store blocker logic 246.

FIG. 12 illustrates that the processors 104a-104n, system bus, and shared cache 1220 are each included within a chip package 1250. In addition, the system includes an off-chip memory 1260 that is connected to the package 1250 via an interconnect 1270. Although FIG. 12 illustrates processors 104a-104n are coupled to, and communicate with each other, via a system bus, one skilled in the art will recognize that other types of interconnects, such as point-2-point interconnects, with a variety of topologies, such as ring or hypercube, may be used in place of system bus.

As used herein, the term "instruction information" is meant to refer to basic units of work that can be understood and executed by the execution core 130. Instruction information may be stored in a cache 225. The cache 225 may be implemented as an execution instruction cache or an execution trace cache. For embodiments that utilize an execution instruction cache, "instruction information" includes instructions that have been fetched from an instruction cache and decoded. For embodiments that utilize a trace cache, the term "instruction information" includes traces of decoded micro-operations. For embodiments that utilize neither an execution instruction cache nor trace cache, "instruction information" also includes raw bytes for instructions that may be stored in an instruction cache (such as I-cache 244).

The processing system 100 includes a memory subsystem 240 that may include one or more caches 242, 244 along with the memory 102. Although not pictured as such in FIG. 2, one skilled in the art will realize that all or part of one or both of caches 242, 244 may be physically implemented as on-die local caches to the processor core 104. The memory subsystem 240 may be implemented as a memory hierarchy and may also include an interconnect (such as a bus) and related control logic in order to facilitate the transfer of information from memory 102 to the hierarchy levels. For at least one embodiment, the control logic includes store blocker logic 246 to prevent commission of speculative Store data to memory 102. (In some embodiments, the control logic of the memory subsystem 240 may also include dependence blocker logic 236; such embodiments, wherein dependence blocker logic 236 is included within the memory subsystem 240 rather than the processor 104, are discussed below in connection with FIG. 6). One skilled in the art will recognize that various configurations for a memory hierarchy may be employed, including non-inclusive hierarchy configurations.

FIG. 1 illustrates that cache 225 may be implemented as an execution instruction cache. For such embodiments, the fetch/decode unit 222 may be utilized to fetch and decode instructions from the I-cache 244 and place them into the execution instruction cache 225. The execution instruction cache provides decoded instructions, sometimes generically referred to herein as "instruction information," to the processor core 130 upon a hit in the execution instruction cache 225.

FIG. 1 further illustrates that, in an alternative embodiment, the cache 225 may be implemented as a trace cache. For such embodiments, the fetch/decode unit 222 decodes instructions into micro-operations that can be understood by the execution units (not shown) of the processor core 130, and stores "traces", which are frequently recurring sequences of decoded micro-operations ("micro-ops"), in the trace cache 225. Upon a hit in the trace cache, the front end 120 delivers decoded micro-operations, sometimes generically referred to herein as "instruction information," from the trace cache to the processor core 130.

For at least one embodiment, the trace cache 225 is a high-speed memory that stores decoded micro-ops in the order of program execution. Decoded instructions are stored in the trace cache after they have been fetched, decoded, and built into sequences of micro-ops called "traces". This storage of decoded instructions may provide enhanced performance, because it allows for, instead of repeating fetch and decode processes, retrieving the decoded instruction from the trace cache. Such re-use is beneficial, for instance, with repeated code sequences such as loop structures.

During execution, the processor 104 searches the trace cache 225 for the instruction it needs. If that instruction appears in an existing trace, the fetch and decode of instructions from the memory hierarchy ceases and the trace cache 225 becomes the new source of instructions. If the program in execution incurs a miss in the trace cache, then a new trace is built. During building of new traces, instruction fetch from the I-cache 244 may incur cache misses. As is explained immediately below, the I-cache 244 may be "warmed up" when instructions are fetched into the I-cache 244 upon an I-cache miss during the trace build process.

In many embodiments, it may be desirable to forward instructions from the trace cache to the processor core 130 during execution. For processors that implement cache 225 as a trace cache, accesses to the instruction cache 244 occur during trace cache build mode (such as when a trace cache miss is being serviced). Therefore, instruction fetch from the instruction cache or a higher level of the memory hierarchy often occurs during a trace build mode in embodiments where a trace cache is utilized. Accordingly, in such a system trace building and instruction fetching are closely related.

Figure 2:
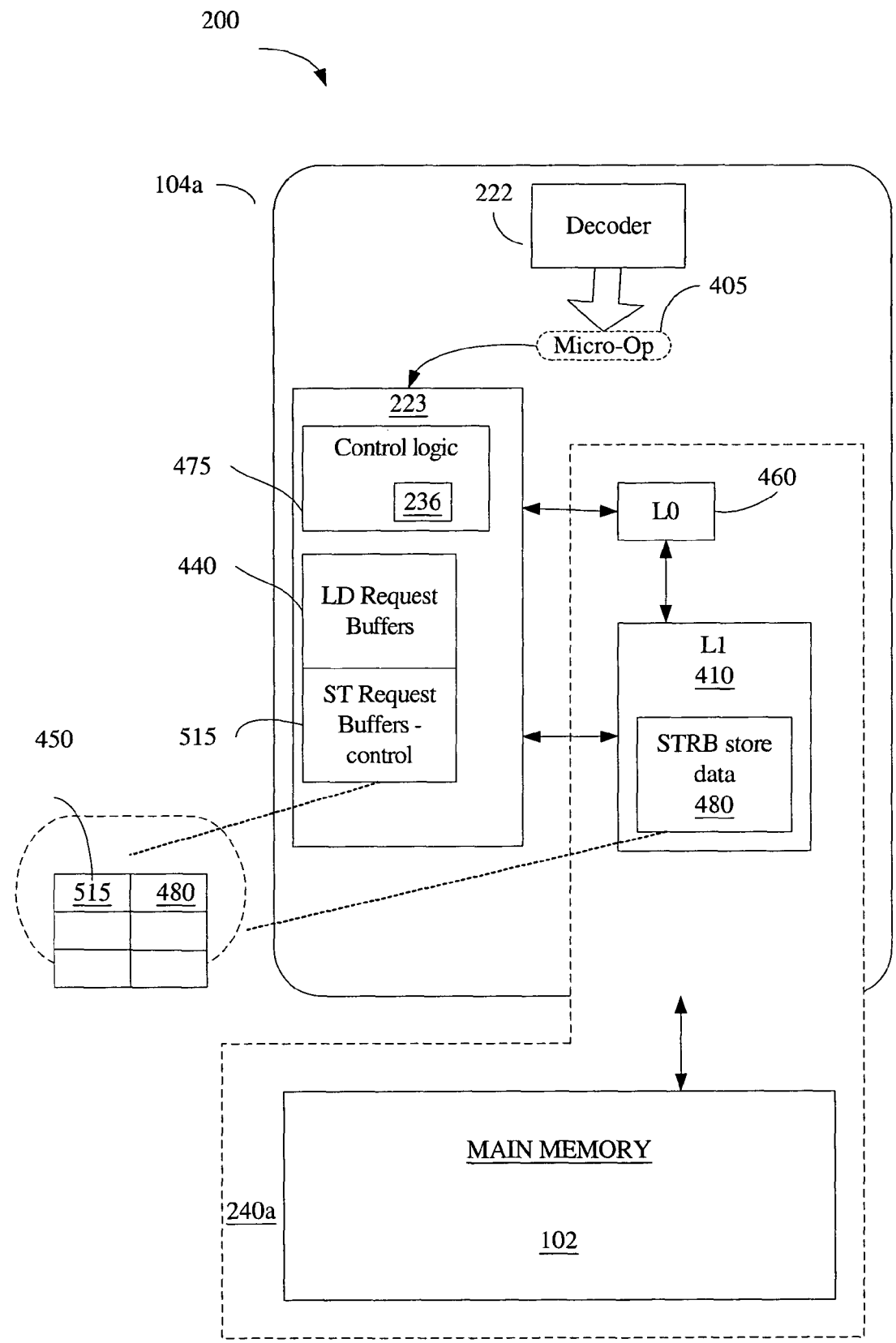
FIG. 2 is a block diagram illustrating of at least one embodiment of a processing system that utilizes store request buffers.

FIG. 2 is a functional block diagram illustrating in further detail at least one embodiment of processor 104a including load request buffers 440 and store request buffers 450 as part of a memory ordering buffer (MOB) 223. FIG. 2 illustrates a processor 104a that implements a non-blocking cache memory subsystem (the cache memory subsystem will sometimes be referred to herein by the shorthand terminology "cache system"). The cache system includes an L0 cache 460 and an L1 cache 410. For at least one embodiment, the L0 cache 460 and L1 cache 410 are on-die caches. The processor 104a may also retrieve data from a main memory 102. The main memory 102, L1 cache 410, and L0 cache 460 together form a memory hierarchy 240a.

The memory order buffer ("MOB") 223 acts as a separate schedule and dispatch engine for data Load and Store instructions. The MOB 223 may also temporarily hold the state of outstanding Load and Store instructions from dispatch to completion. This state information may be maintained in load request buffers 440 and store request buffers 450. For at least one embodiment, the MOB 223 includes control logic 475. Control logic 475 includes dependence blocker logic 236 to prevent speculative-thread Store data from being bypassed to a Load instruction of a non-speculative thread. For at least one embodiment, the dependence blocker logic 236 may permit store-forwarding of speculative Store data to loads among speculative threads.

In many processors, including the processor 104a illustrated in FIG. 2, instructions received by the decoder 222 are decoded into one or more micro-ops 405. A Store instruction received by the decoder 222 is subdivided by the decoder 222 into a Store-address micro-op and Store-data micro-op. The Store-address micro-op indicates the memory address to which data is to be stored. The Store-data micro-op indicates the data value that is to be stored at the memory address indicated by the Store-address micro-op. The Store-address and Store-data micro-ops are forwarded to the MOB 223.

It will be apparent to one of skill in the art that, although only an out-of-order processing system 100 is illustrated in FIG. 2, the embodiments discussed herein are equally applicable to in-order processing systems as well. Though such in-order processing systems typically do not include MOB 223, for non-blocking cache system, even in-order processing systems can still process load and store operations out of order via one or more mechanisms that handle load and store requests and bypassing between these operations.

FIG. 2 illustrates that, in a non-blocking cache system that allows multiple outstanding loads and stores, load request buffers ("LDRB's") 440 and store requests buffers ("STRB's") 450 may be used by the MOB 223 to keep track of memory access requests that have not yet completed. In such systems, such as for example the Pentium® Pro processor, the MOB 223 is responsible for resolving memory dependencies between in-flight Store and Load instructions. For at least some embodiments, the MOB 223 may also be responsible for enabling data bypassing in the execution pipeline before the Store data is sent to a data cache.

Control logic 475 of the MOB 223 determines, when a Store-address micro-op is received, whether the address specified by the micro-op is in the L0 cache 460. If so, the specified cache line is updated with the data indicated by the Store-address micro-op.

If there is a miss in the L0 cache 460, or if the data in the desired location of the L0 cache 460 is stale, then the control logic 475 determines whether the address specified by the Store-address micro-op is present in the LDRB's 440 or the STRB's 450. One should note that, even for load instructions, the cache line at the load address may be brought into the processor 104a and placed in an entry of the LDRB's 440; this action is based on the assumption that, due to principles of spatial locality, a subsequent read or write to/from the cache line is likely to occur relatively soon. The STRB's 450 and LDRB's 440 are intended to represent any storage area capable of storing information, including addresses, regarding memory access requests that have not yet completed.

Figure 3:
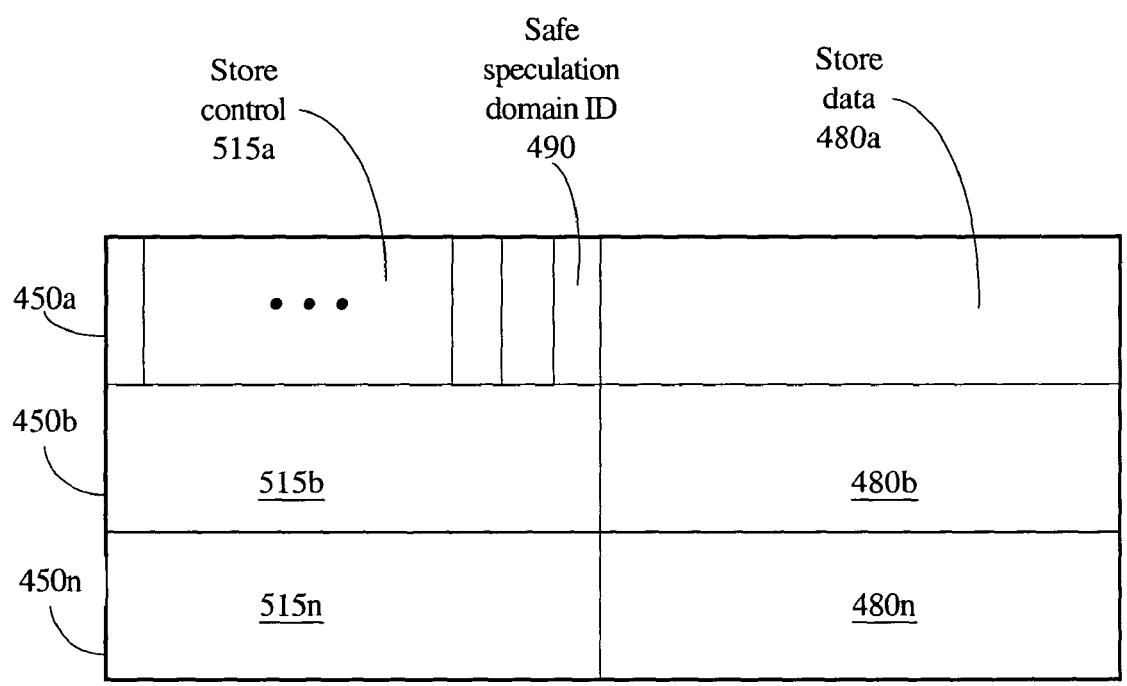
FIG. 3 is a block diagram of at least one embodiment of a store request buffer that includes a safe speculation domain ID field.

FIG. 3 illustrates that a control portion 515 of each STRB entry 450a-450n includes a field, referred to as the safe speculation domain ID 490, whose contents indicate whether the STRB entry 450a-450n is associated with a speculative thread domain. The data portion 480a-480n of an STRB entry 450 contains the data to be stored to the memory hierarchy (such as, for example, 240a in FIG. 2) upon eviction of the STRB entry 450a. Although logically associated with each other as illustrated in FIG. 3, one skilled in the art will recognize that the control portion 515 and the data portion 480 of an STRB entry 450a-450n need not necessarily physically reside in contiguous storage areas of a storage device, nor even reside in the same storage device. For instance, FIG. 2 illustrates that the control portion 515 of the STRB's 450 may be included in the MOB 223 while the data portion 480 may reside in an on-die cache 410.

Returning to FIG. 2, we further discuss control logic 475. The control logic 475 includes logic that allows store-to-load memory dependencies to be honored during speculative execution in a helper thread. The logic provides for execution of speculative Store instructions in a helper thread while shielding the effect of the speculatively executed Store instructions from non-speculative threads. In other words, loads from the non-speculative thread(s) are prevented from consuming the data from the speculative Store instruction. In at least some embodiments, the architecture state caused by Store instructions in a speculative thread is visible to other speculative threads and potentially can be consumed by the load instructions in these other speculative threads.

Processor 104a may be implemented as a multithreaded processor 104 wherein the MOB 223 is shared among two or more threads. Control logic 475 contains logic for processing of Store-address micro-ops such that the safe speculation domain ID (490, FIG. 3) is considered part of the control information 515 that is used during a dependence check. That is, control logic 475 utilizes the value of the safe speculation domain ID 490 (FIG. 3) as part of the address information that it uses to determine memory dependency between in-flight Store and Load instructions, and to determine whether to bypass data from pending Store instructions to dependent Load instructions in the pipeline before the Store data has been forwarded to one or more caches (such as L0 460 and/or L1 410). Control logic 475 thus utilizes the safe speculation domain ID 490 (FIG. 3) to restrict bypass of data in the MOB 223 to ensure that a non-speculative Load instruction does not receive data from a speculative Store instruction. Such restriction on forwarding achieves dependence blocking such that speculative Store data is not forwarded to Load instructions of the non-speculative thread.

Figure 4:
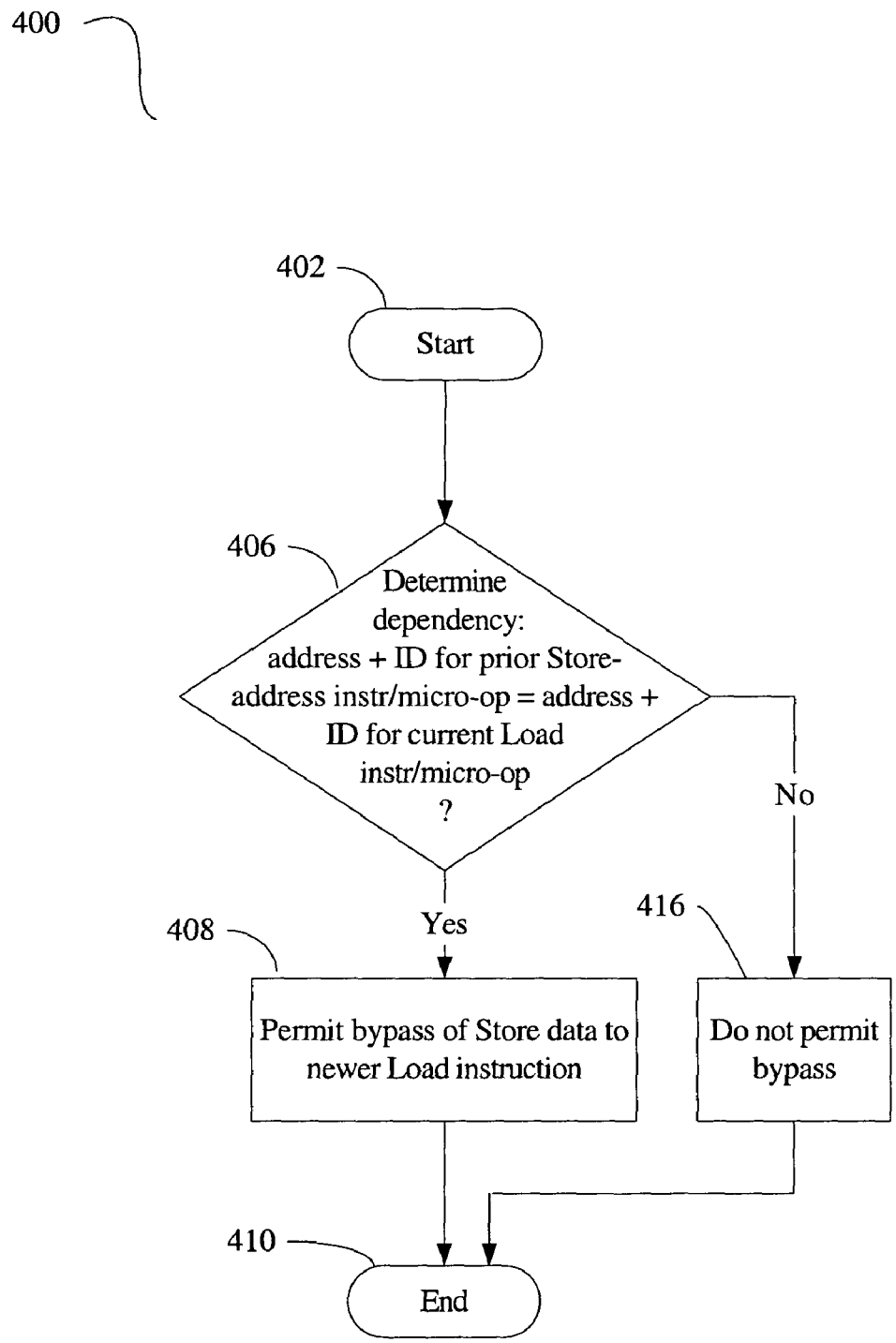
FIG. 4 is a flowchart illustrating at least one embodiment of a method for performing limited store-forwarding to achieve dependence blocking.
Figure 5:
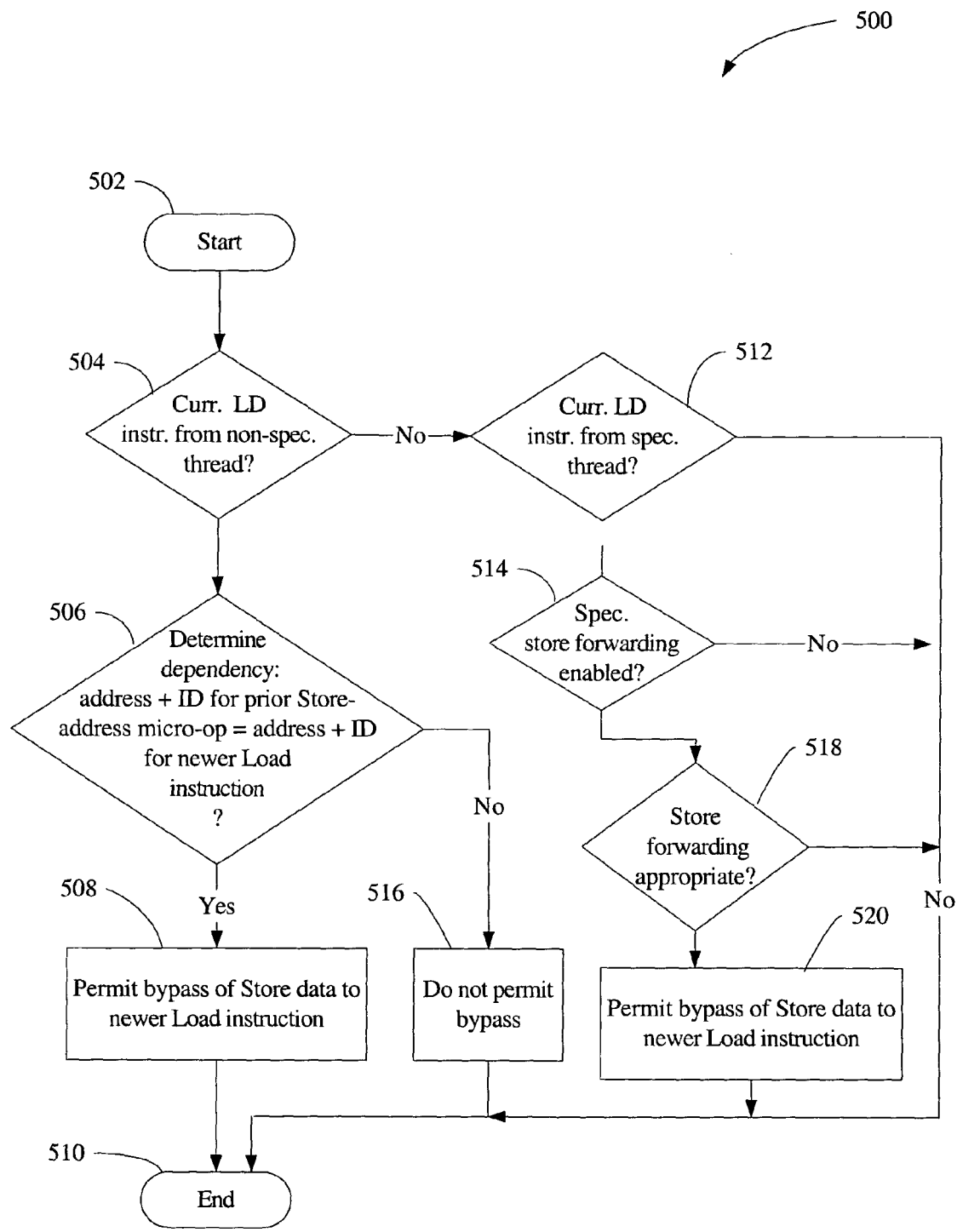
FIG. 5 is a flowchart illustrating at least one other embodiment of a method for performing limited store-forwarding to achieve dependence blocking.

Turning now to FIGS. 4 and 5, methods 400 and 500 allow store-to-load memory dependencies to be honored during speculative execution in a helper thread, without incurring the hardware complexity associated with category 1 techniques. The FIG. 4 method 400 illustrates a broad method of dependence-blocking to prevent all bypass of speculative Store data among threads, while the FIG. 5 method 500 includes additional processing to allow bypassing of Store data among speculative threads. Each of the methods 400, 500 operate to prevent visibility of speculative Store data to the non-speculative thread. The methods 400, 500 may be applied to both data and instruction prefetching.

For at least one embodiment, the methods 400, 500 are implemented in dependence blocker logic 236 associated with a MOB (such as, for example, 223 in FIG. 2). One skilled in the art will recognize that the logical blocks depicted in FIGS. 4 and 5 illustrate functionality that may, in certain hardware embodiments, be performed concurrently or in different sequence than that shown. Also, individually illustrated blocks may be functionally combined with other blocks.

Reference is briefly made to FIGS. 1 and 3 to discuss that at least one embodiment of each method 400, 500 operates on the assumption that prior processing has been performed. That is, the methods 400, 500 assume that, when the current micro-op was fetched and decoded by decoder 222, marking logic 180 associated with the particular thread context's sequencer 420 either 1) placed the thread id for that particular thread context in the safe speculation domain ID 490 for the current micro-op or 2) forwarded the thread id for that particular thread context to the MOB 223, which placed the thread id in the safe speculation domain ID 490 for the current micro-op. The speculation domain ID 490 value is then treated as part of the address used in the dependence check 506, as described below.

One skilled in the art will recognize that the speculation domain ID 490 field need not necessarily reflect a thread ID value. For instance, for at least one alternative embodiment, the speculation domain ID field 490 may reflect a 1-bit mode value that indicates whether the instruction is associated with a speculative thread. In addition, other types of values may be used to reflect in the speculation domain ID field 490 the nature of the thread.

One skilled in the art will also recognize that different marking schemes may be utilized depending at least upon how the speculative helper thread is activated. For helper thread activation that is hardware-based, spawn hardware is responsible for associating a "safe speculation" status with the hardware context allocated to run the helper thread. The sequencer for the context associated with the "safe speculation" status is then responsible for the thread ID processing discussed above.

Alternatively, for helper thread activation that is software based, the spawn instruction that triggers a helper thread is responsible for associating a "safe speculation" status with the hardware context allocated to run the helper thread.

Furthermore, if safe-store operation is explicitly encoded as an architecturally distinct instruction or instruction hint, then the decoder is responsible for associating a "safe speculation" status for the particular store operation.

FIG. 4 illustrates that operation for method 400 begins at block 402. For at least one embodiment, operation begins at block 402 when a Load instruction (or micro-op) is presented to the MOB 223 (FIG. 1) for potential bypass. A dependence check is then performed at block 406 to determine if store-forwarding should be allowed to the current Load instruction from an in-flight Store instruction—a previous Store instruction that has been executed but whose Store data has not yet been evicted from the store request buffers (see 450, FIGS. 2 and 3).

Reference is made to FIGS. 1, 2, 3 and 4 for further discussion of the dependence check 406. The dependence check 406 includes, for at least one embodiment, evaluation of the value of the speculation domain ID indicator 490 discussed above in connection with FIG. 3. The value of the speculation domain ID indicator 490 represents, for at least one embodiment, the thread id for the thread context for which the incoming micro-op was fetched by decoder 222.

At block 406, a comparison is performed to see if any Store address, as reflected in the control portion 450 of the store request buffers, matches the address of the current Load instruction. As is discussed above, the speculation domain ID 490 is considered as part of the address for purposes of the dependence check 406. Accordingly, if there is not a thread-to-thread match between the addresses of Store and Load instructions under consideration, the dependence check is not successful and bypass will not be permitted 416. That is, if (address+safe speculation domain ID) for the Store instruction does not match (address+safe speculation domain ID) of the Load instruction, then the load and store instructions did not originate with the same thread. For such case, bypass is not permitted (block 416) and processing ends at block 410. (Note: "+" denotes conjunction or concatenation (or just "and" but not "Boolean and") and does not denote numeric addition.) If, however, there is a match (meaning that the addresses match and the instructions therefore originated from the same thread context), then the dependence check is successful and bypass is permitted at block 408. Processing then ends at block 410.

FIG. 5 illustrates at least one alternative embodiment to the store-forwarding method 400 illustrated in FIG. 4. The FIG. 5 method 500 differs from the FIG. 4 method 400 in that the FIG. 5 method 500 allows store-forwarding among speculative threads. That is, for Store and Load instructions originating from different speculative threads, such that the values in their speculation domain ID indicators 490 do not match, store-forwarding between the two speculative threads may nonetheless be permitted.

FIG. 5 illustrates that operation begins at block 502. At block 504 it is determined whether the current micro-op pertains to a Load instruction from the non-speculative thread. In a system where the store-forwarding method 500 is only invoked when the MOB 223 (FIG. 2) receives information regarding a LD instruction, then it only need be determined at block 504 whether the LD instruction is associated with the non-speculative thread.

If one knows the thread id for a non-speculative thread, then one can determine whether an instruction is associated with the non-speculative thread by comparing the speculation domain ID 490 with the known thread id for the non-speculative thread. Such action is logically represented at block 504 in FIG. 4. However, for at least one embodiment, this step is performed implicitly at block 506 during an address comparison.

If the current Load instruction is not an instruction from the non-speculative thread, then block 512 is performed. At block 512, it is determined whether the current instruction is a LD instruction from a speculative thread. One skilled in the art will recognize that block 512 need not be explicitly performed for a system where the store-forwarding method 500 is only invoked when the MOB 223 (FIG. 2) receives information regarding a LD instruction. That is, if it is known upon entry 502 to the method 500 that a LD instruction has been received, and it is determined at block 504 that the LD instruction is not associated with the non-speculative thread, then one can assume that the check at block 512 will always evaluate to true.

Whether the speculation/Load checks 504, 512 are implicitly or explicitly performed, processing proceeds to block 514 if the current instruction is a Load instruction from a speculative thread. Otherwise, processing ends at block 510. For a system where the nature of the instruction is not determined before entry 502 into the method 500, block 510 is reached when the current instruction is not a Load instruction.

At block 506, a dependence check is performed as discussed above in connection with block 406 of FIG. 4. If the address comparison (address+speculation domain ID) for the current Load instruction with a prior Store instruction in the STRB's (450, FIGS. 2, 3) evaluates to true, then the dependence check is successful and store-forwarding of the prior Store data is permitted to the current Load instruction at block 508. Accordingly, for at least one embodiment store-forwarding occurs at block 508 when a successful dependence check 506 indicates that the current Load instruction and a prior Store instruction both originate from the non-speculative thread. After store-forwarding is performed at block 508, processing ends at block 510.

If the dependence check at block 506 evaluates to false, then store-forwarding to the current non-speculative Load instruction is not permitted 516, and the method 500 ends at block 510.

At block 514, processing continues for a current Load instruction from a speculative thread. At block 514, it is determined whether store-forwarding among speculative threads is to be permitted. One skilled in the art will realize that, for a system wherein store-forwarding is always permitted among speculative threads, block 514 need not be performed. In some embodiments, however, store-forwarding is supported as a configurable feature. In such embodiments, the check at block 514 determines whether the system is currently configured to permit store-forwarding from a Store instruction from one speculative domain to a Load instruction in another speculative domain.

If store-forwarding among speculative domains is enabled, processing proceeds to block 518. At block 518, it is determined whether store forwarding is appropriate. That is, even when store forwarding among speculative threads is enabled (see block 514), it may nonetheless be inappropriate to forward Store data in some circumstances. For instance, for at least one embodiment store-forwarding is only permitted from a speculative thread that is older (in program order) to one that is younger. Other compatibility features among threads may also be considered at block 518 to determine whether store-forwarding among speculative threads is appropriate. For at least one embodiment, the determination at block 518 is implemented with a programmable masking scheme.

If it is determined at block 518 that store-forwarding is to be permitted, such store-forwarding is performed at block 520 and processing then ends at block 510. Otherwise, processing proceeds directly to block 510 and ends.

Accordingly, the discussion above sets forth embodiments of an apparatus and methods for performing dependence blocking in an in-pipeline mechanism such as a MOB 223 (FIG. 2). In many multithreaded microarchitecture designs, such as the Pentium® 4 microprocessor available from Intel Corporation as well as many CMP processors, bypass of Store data to dependent Load instructions occurs outside the core pipeline and occurs, instead, inside the memory hierarchy (see, for example, 240 in FIG. 1). For instance, in the Pentium® 4 microprocessor available from Intel Corporation, Store-to-Load bypassing for uncommitted Store data occurs in the L1 cache (see 410, FIG. 2).

Figure 6:
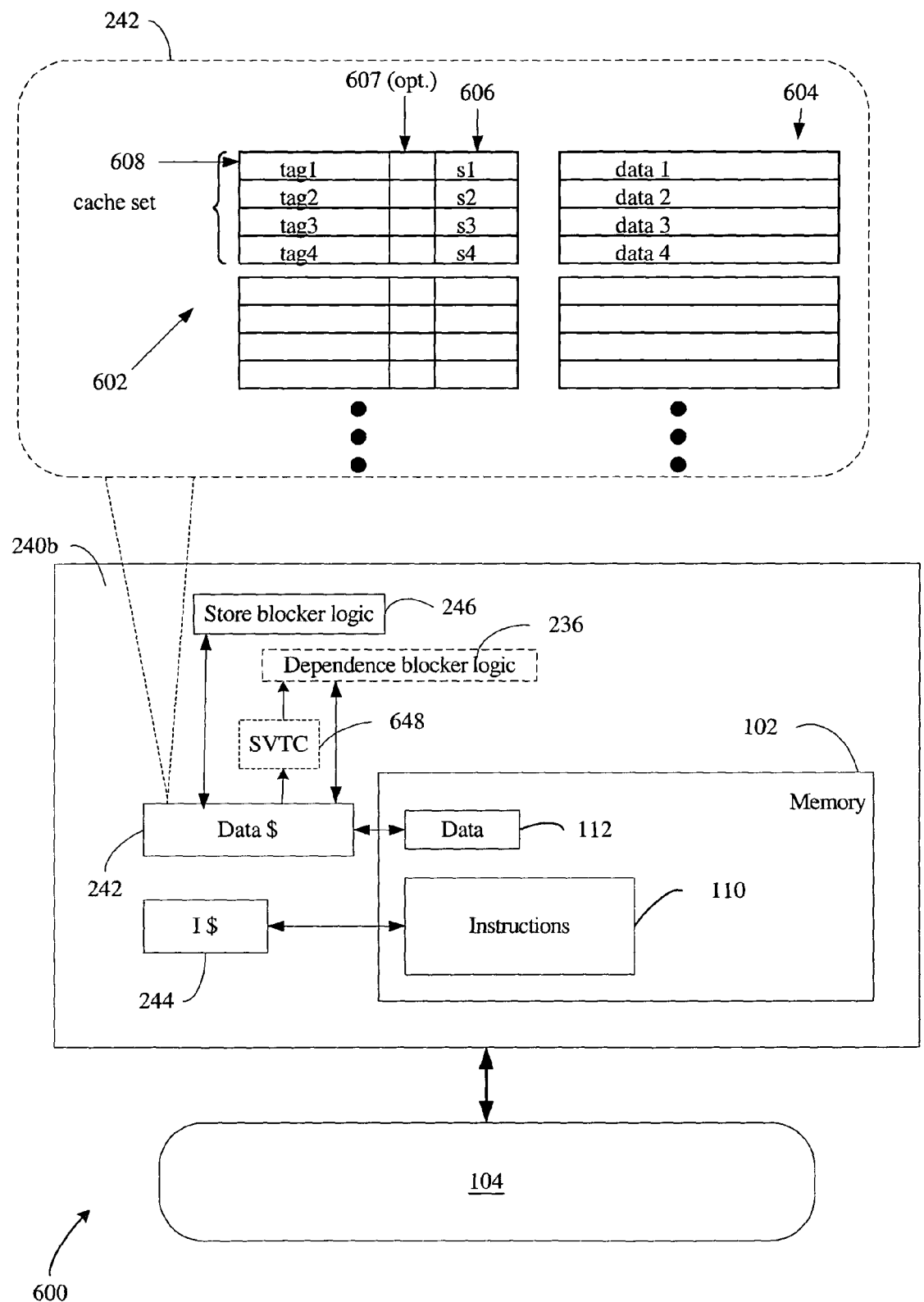
FIG. 6 is a block diagram illustrating at least one embodiment of a processing system having a memory system that utilizes a safe-tag.

FIG. 6 illustrates an embodiment of a processing system 600 that provides dependence blocker logic 236 in the memory hierarchy 240b. FIG. 6 also illustrates at least one embodiment of store blocker logic 246 to prevent speculative helper thread Store data from being committed to memory 102. The processing system 600 includes a modified data cache 242 structure in addition to store blocker logic 246 and dependence blocker logic 236.

The data cache structure 242 illustrated in FIG. 6 represents a 4-way set-associative cache. However, one skilled in the art will recognize that the store-blocker logic 246 discussed herein may be utilized in many variations of cache structure. The logic 246 may operate, for instance, with cache designs of any variation of sector cache organization, associativity, capacity, memory hierarchy levels, and cache line granularity.

FIGS. 1, 2 and 6 are referenced to discuss that the store blocker logic 246 operates to prevent commission of speculative Store data to memory 102 from a data cache 242. Such approach is useful in order to prevent commission of speculative Store data to memory 102 even in those systems that include dependence blocker logic 236 in a structure such as a MOB 223 to perform Store-to-Load bypass. That is, for an embodiment such as processing system 100 shown in FIG. 1, the dependence blocker logic 236 may be implemented in the processor 104 (as part of a MOB, for instance) while a store blocker mechanism, including store blocker logic 246 and a modified data cache 242 (see FIG. 6), may be implemented to prevent commission of speculative Store data to memory 102. In such embodiment, dependence blocker logic 236 is not present in the memory system 240. The optional nature of dependence blocker logic 236 in the memory system 240 is denoted by dotted lines in FIG. 6.

However, some systems, as discussed above, perform Store-to-Load bypass in the memory hierarchy 240 instead of the MOB 223. In such case, dependence blocker logic 236 may be implemented in the memory hierarchy 240, as illustrated in FIG. 6.

FIG. 6 illustrates that data cache 242 includes a tag array 602 and a data array 604. In some embodiments, such as in the Pentium® 4 microprocessor available from Intel Corporation, data cache 242 may be implemented as the L1 cache 410 (see FIG. 2).

In accordance with known cache management techniques, a line of the tag array 602 includes a tag value, denoted as tagx. The tag value tagx, sometimes referred to herein as the "regular tag," includes an address, which may be a physical address or a virtual address. In addition, various embodiments of the regular tag tagx may additionally include one, or both, of a thread ID field, and context ID field. The value of the thread ID field may reflect a physical thread ID, similar to the speculation domain id 490 field referenced above in connection with FIG. 3. The value of the context ID field may reflect a process ID indicator, such as the CR3 value used in Pentium® 4 microprocessors.

FIG. 6 illustrates that each line of the tag array 602 includes a safe-store indicator field 606. The safe-store indicator field 606 may include one or more bits. Logically, the safe-store indicator field 606 may be conceptualized as an extension or enhancement to the lines of a traditional tag array 602 in order to allow for enhanced validity checking to support store blocking (and, in some embodiments, dependence blocking). As used herein, a regular tag value tagx and an associated safe-store indicator value, sx, are referred to collectively as a "safe-tag" 608.

For at least one embodiment, the safe-store indicator field 606 is a single bit. The value of the single bit in the field 606 indicates whether or not the cache line indicated by the safe-tag is associated with a speculative helper thread. That is, one value (such as a logic-high value) for the bit indicates that the associated line in the data array 604 is speculative, while the other value (such as a logic-low value) indicates that the associated line in the data array 604 is not speculative. For at least one embodiment, the value of the safe-store indicator 606 field is set as a result of marking logic 180 (FIG. 1).

A single-bit implementation of the safe-store indicator field 606 may be utilized to prevent bypass of speculative-thread Store data to a Load instruction from a non-speculative thread. That is, consider an embodiment wherein the safe-tag 608 includes a regular tag, tagx, which includes only a physical or virtual address. In such embodiment, the safe-tag 608 includes <virtual address+single-bit safe-store indicator>. When such a safe-tag 608 is used for tag matching during data forwarding in the memory system 240, an address match will not occur between speculative and non-speculative instructions for the same memory address. In such scheme, since speculative threads are not individually identified, store-forwarding among speculative threads is not likely to be supported.

If, however, a single-bit safe-store field 606 value is used in conjunction with a regular tag that includes a thread ID field or context ID field, more complex store-forwarding may be supported. In such case, the safe-tag 608 effectively defines a speculation domain for the corresponding thread. Defining a speculation domain in the safe-tag 608 may facilitate implementation of a dependence-blocking scheme that allows bypass of Store data among speculative threads.

For at least one alternative embodiment, the safe-tag 608 additionally includes an optional unique helper thread ID field ("safestores_ht_uid") 607 in addition to a single-bit safe-store indicator field 606. The unique helper thread ID field 607 may be a multi-bit value (such as, for example, for embodiments that support more than two helper threads). In such embodiment, a safe tag 608 including <physical address, safestores_ht_uid, safe-store indicator> may be utilized to perform tag matching during data forwarding in the memory system 240. Such embodiment may be useful for embodiments wherein a single non-speculative thread spawns multiple concurrent helper threads. The optional unique helper thread ID field 607 ("safestores_ht_uid") enables multiple helper threads to write to and from their own copy of the same virtual address location. In such cases it may be important to limit the number of ways allocated in a single cache set for safe stores to some maximum value that is less than the first level data cache's associativity to reduce contention with the non-speculative thread for data cache storage. Furthermore, the replacement policy may also be modified to preferentially evict safe-store-modified lines over non-speculative thread-modified lines.

One skilled in the art will recognize that the safe-store indicator field 606 and/or the optional unique helper thread ID field 607 need not necessarily be physically incorporated into the tag array 602 as illustrated in FIG. 6. That is, values for the safe-store indicator field 606 and/or the unique helper thread ID field 607 may, for an alternative embodiment, be stored in the data array 604 in a manner analogous to a valid bit (not shown).

FIG. 6 illustrates an optional safestore victim tag cache ("SVTC") 648. The SVTC 648 may be included in an embodiment that includes the optional unique helper thread ID field 607. The victim tag cache 648 contains the address and safestores_ht_uid for the last N evicted safestore-modified lines, where N is a design parameter. For at least one embodiment, increasing N increases the accuracy with which a dependence violation is detected. However, higher values for N implies greater implementation complexity and at some point the additional accuracy may no longer yield additional performance benefit.

For at least one embodiment, the SVTC 648 snoops evictions from the D-cache tag array 602 and updates its own entries accordingly. As is explained below in connection with FIG. 8, the SVTC 648 may be queried by the logic, such as dependence blocker logic 236, that manages Store-to-Load forwarding.

FIGS. 7-10 illustrate methods of performing cache hit/miss determinations and/or writeback determinations in a memory system (e.g., 240b in FIG. 6) that supports a safe-tag (e.g., 608 in FIG. 6). Each of the methods 800, 900, 1000 illustrated in FIGS. 8-10, respectively, includes the preliminary processing 700 illustrated in FIG. 7.

Figure 7:
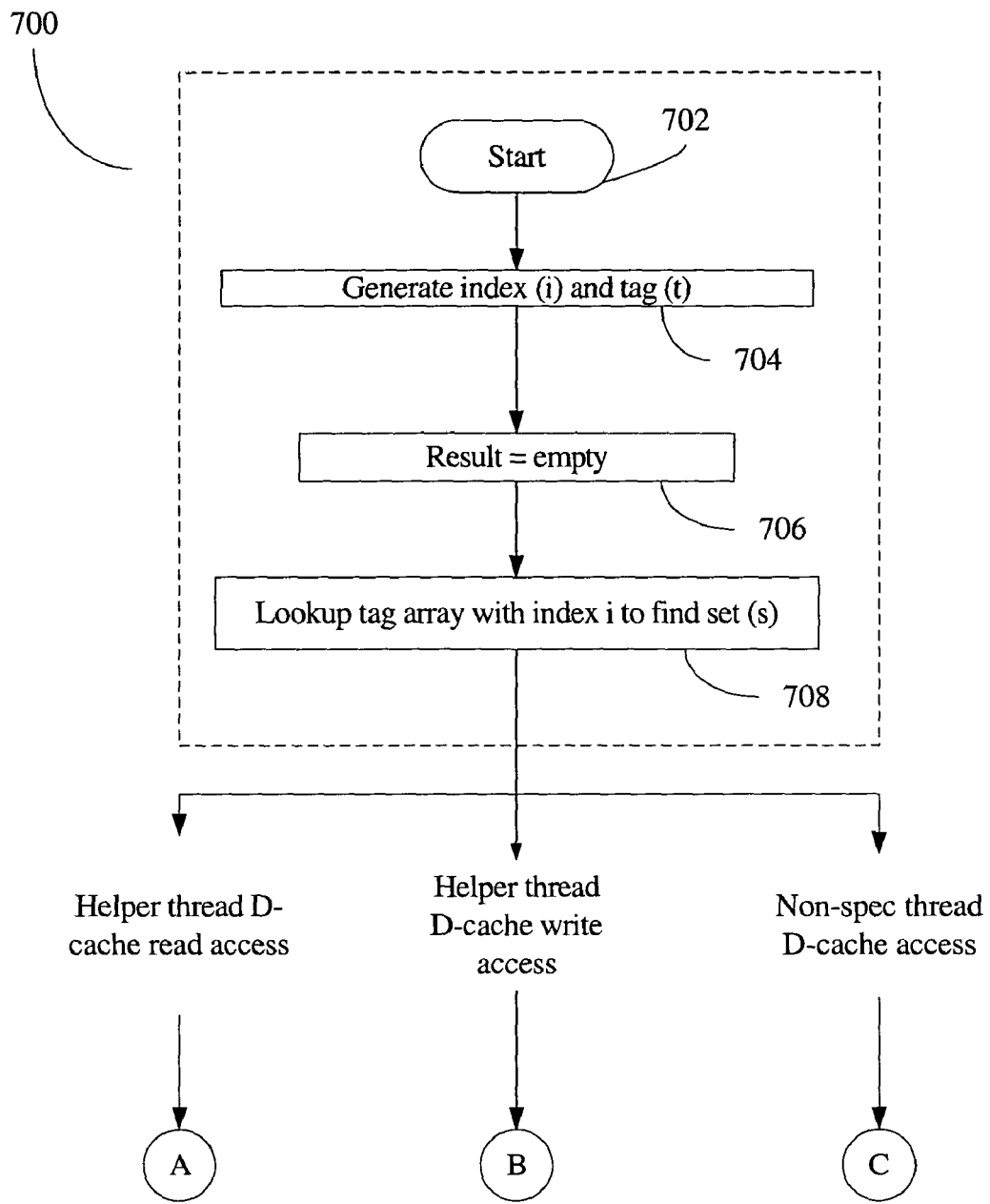
FIGS. 7-10 are flowcharts illustrating at least one embodiment of a method for performing dependence blocking and store blocking in a memory system.
Figure 8:
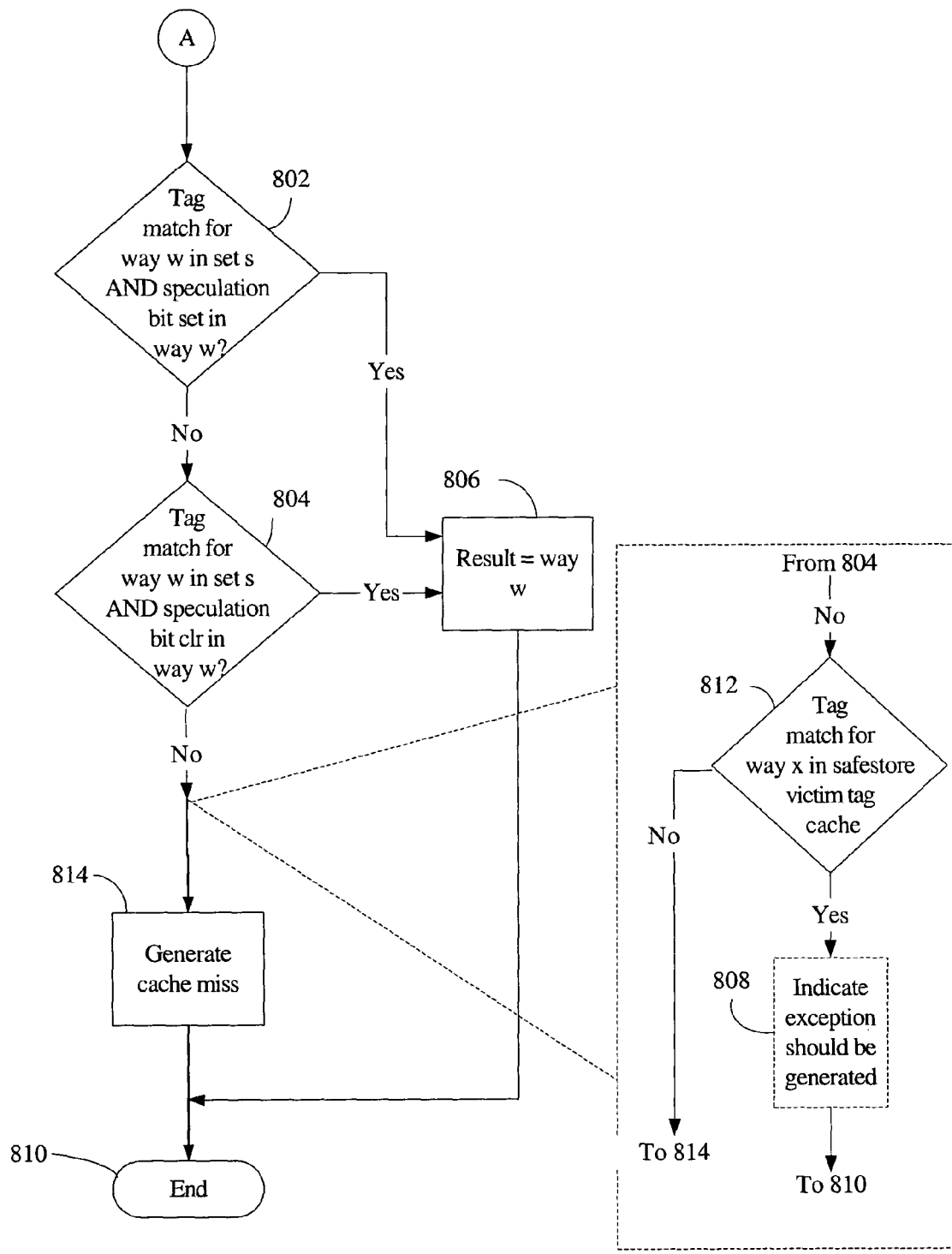
Figure 9:
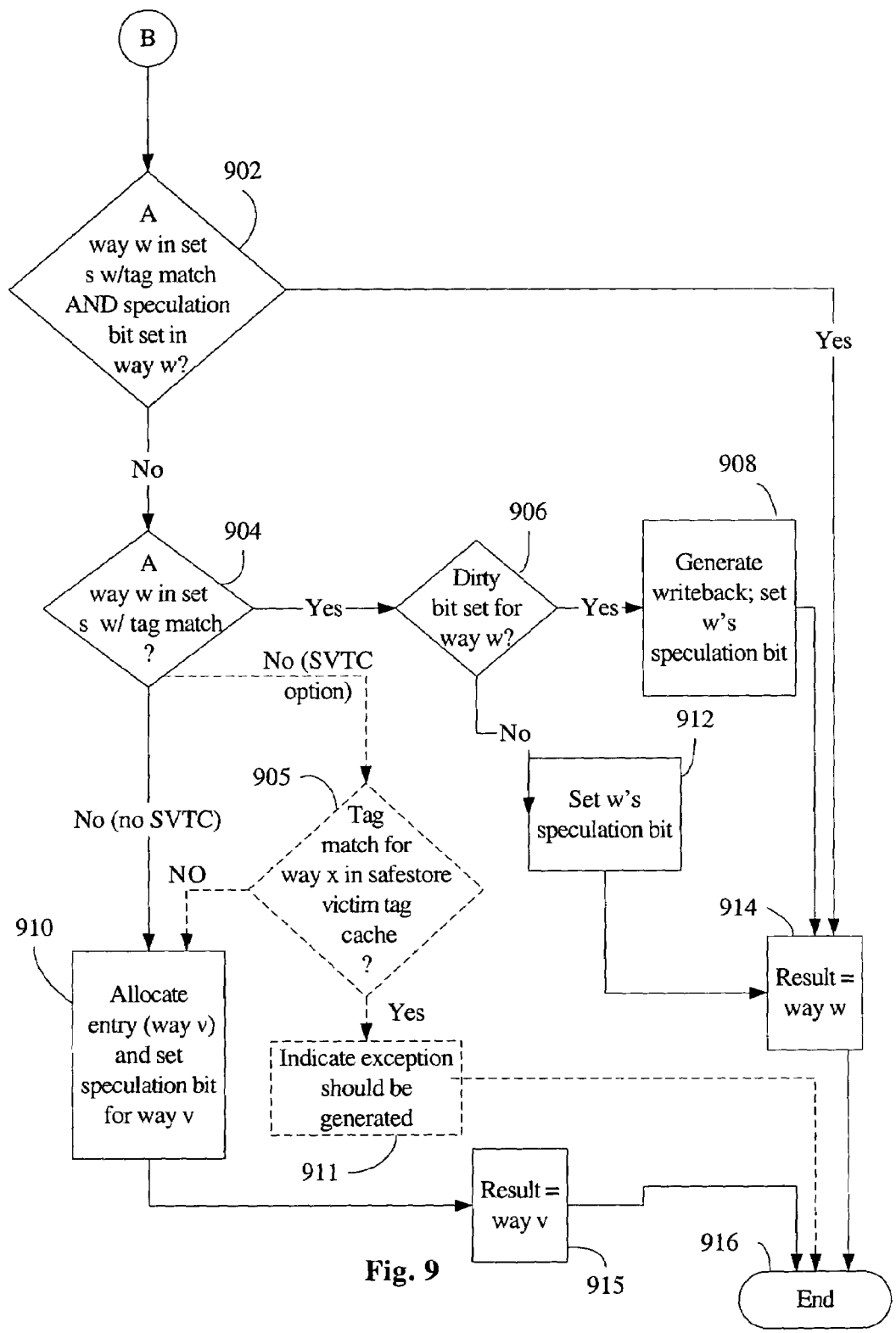
Figure 10:
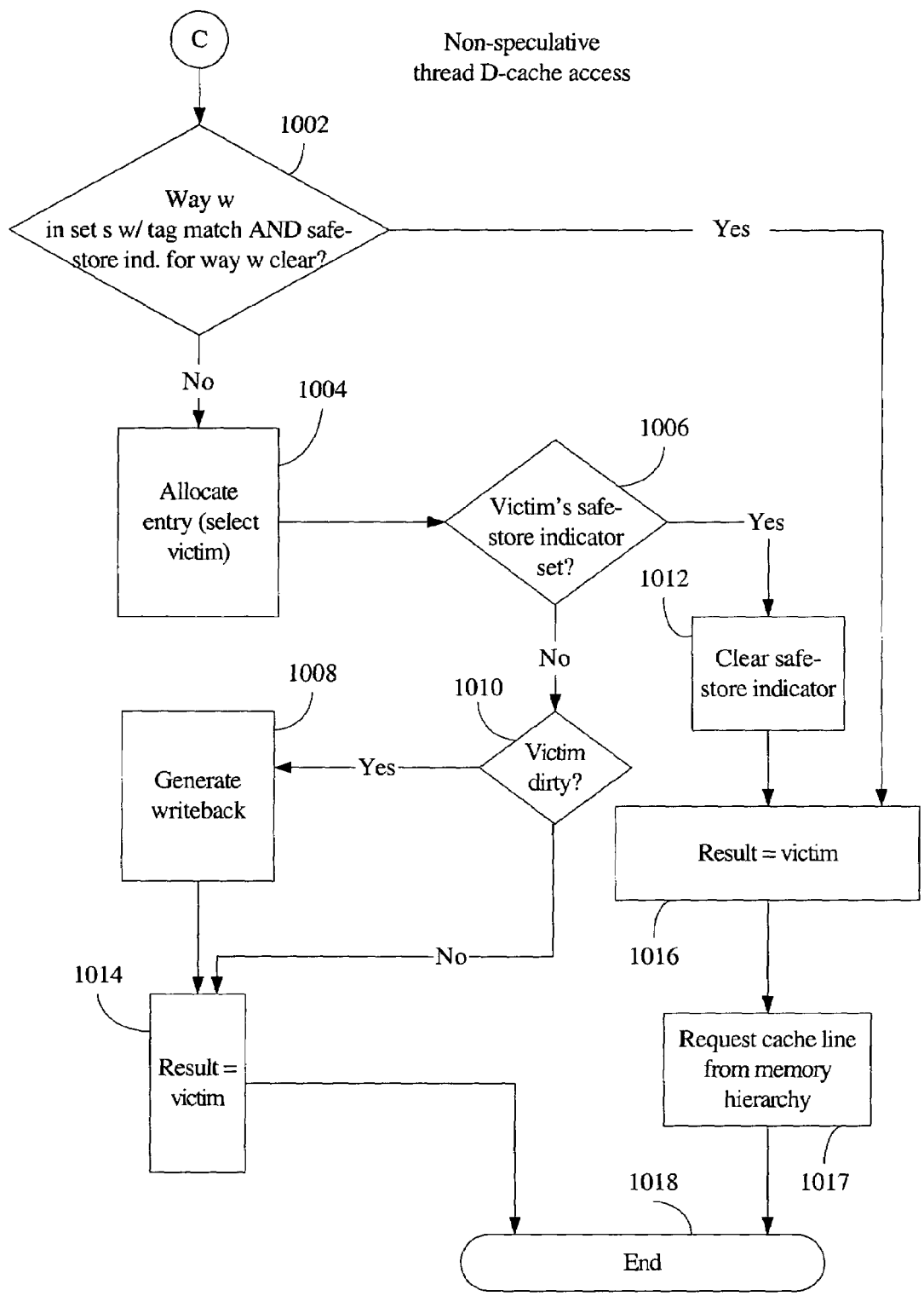

FIGS. 7 and 8 illustrate a method 800 of performing hit/miss determination for a helper thread read access request to a cache (e.g., 242 in FIG. 6). FIGS. 7 and 9 illustrate a method 900 of performing hit/miss determination and store blocking for a helper thread write access request to a cache (e.g., 242 in FIG. 6). FIGS. 7 and 10 illustrated a method 1000 of performing hit/miss determination and store blocking for a non-speculative thread read or write access request to a cache (e.g., 242 in FIG. 6).

Turning to FIGS. 7 and 8, one can see that a method 800 for determining a hit or miss for a helper thread data cache read access request includes the preliminary processing 700 of FIG. 7 as well as the processing 802-810 illustrated in FIG. 8. The illustrated method 800 serves to provide Store-to-Load bypassing from the non-speculative thread to the speculative thread by allowing a "hit" determination to be generated when a tag match is found, even if the matching data was generated by a non-speculative thread. In this manner, data from a Store instruction of the non-speculative thread may be bypassed to a speculative thread. Further, the method 800 ensures dependence blocking to prevent Loads from non-speculative threads from reading data placed in the cache by a Store from a speculative thread.

FIG. 7 illustrates that processing for the method 800 begins at 702. At block 704, index I and tag t are generated in a known fashion for the Load or Store instruction accessing the cache. The result for the hit/miss determination is initiated 706 to "empty." Tag array (such as 602, FIG. 6), is indexed by the index i calculated at block 704 in order to locate set s. While our discussion of the method 800 assumes a set associative cache, one skilled in the art will recognized that, for a directly mapped cache scheme rather than a set-associative cache scheme such as that illustrated in FIG. 6, processing of the method 800 may be modified to take the lack of sets into account.

After the appropriate set s is identified at block 708, if the instruction accessing the data cache is a Load from a speculative thread, processing continues at A as illustrated in FIG. 8. FIG. 8 illustrates that, at block 802, a tag comparison is performed. The tag comparison 802 determines whether any way w in set s matches the address for the desired Load instruction from the speculative helper thread. It is also determined whether the safe-store indicator for way w is set. If so, then a hit is recorded by setting 806 result to way w. If the tag comparison at block 802 evaluates to "true", then setting 806 result to way w will result in speculative Store data being bypassed to the speculative Load instruction.

If, however, the tag comparison at block 802 does not evaluate to "true," a hit is nonetheless recorded 806 if it is determined at block 804 that a way w in set s matches the address for the desired Load instruction from the speculative helper thread and the safe-store indicator for way w is not set. In this manner, Store instruction data from the non-speculative thread may be bypassed to a Load instruction in a speculative helper thread.

FIG. 8 illustrates that a Load instruction from a speculative thread may, according to the method 800, access either speculative data or non-speculative data from the cache. Should there be a memory dependency between a Store instruction in the non-speculative thread and a Load instruction in a speculative thread, the memory dependency will be observed because "hit" will be recorded if the tag match comparison 802 evaluates to true (i.e., the safe-store indicator for way w is set).

However, FIG. 8 illustrates that, if tag matches 802 and 804 evaluate to "false," then either there is no memory dependence in the speculative thread and the non-speculative thread's version of the data is not resident in the cache, or the memory dependency was broken. In one embodiment, this case is treated as if the former was always true. That is, a miss request is generated 814 and forwarded to the next level in the cache hierarchy to bring the non-speculative thread's version of the data into the cache from the memory hierarchy. Generating the cache miss at block 814 effects this fetching of the data into the cache regardless of whether a memory dependence in the speculative thread was broken. (Note: this is orthogonal to the question of whether the address generated by the speculative thread has a valid entry in the virtual memory mapping for the non-speculative thread. The typical action taken if a Load address in a speculative thread does not have a valid virtual memory mapping is either to halt or terminate the speculative thread entirely, or treat the Load operation as a NOP.)

FIG. 8 illustrates additional optional processing 812, 808 that may be performed in an embodiment that utilizes the optional safestores_ht_uid field 607 (FIG. 6) and the SVTC 648 (FIG. 6). FIG. 8 illustrates an alternative embodiment wherein, if tag match 804 evaluates to "false," optional block 812 is executed. At block 812, the safestore victim tag cache 648 (FIG. 6) is consulted to detect whether a speculative-thread-modified cache line has likely been evicted. To do so, the method 800 performs a tag comparison at block 812. The tag comparison 812 determines whether any way x in the SVTC 648 (FIG. 6) matches the address for the desired Load instruction from the speculative helper thread. If the tag is found in the safestore victim tag cache 648 then processing proceeds to block 808. Otherwise, processing proceeds to block 814.

At block 808, a speculation exception is indicated, and processing then ends at block 810. The exception generated at block 808 may be used in the speculative thread context to decide whether the speculative thread should be terminated. Alternatively, the speculation exception may be used in the speculative thread context to trip recovery code that re-executes the Store instruction followed by the speculative Load instruction if the particular Store instruction whose value was evicted can be uniquely identified by the compiler or other mechanism that generated the speculative thread's code.

FIGS. 7 and 9 illustrate a method 900 of performing hit/miss determination and supporting store blocking for a helper thread write access request to a cache (e.g., 242 in FIG. 6). The method 900 includes the preliminary processing 700 of FIG. 7 as well as the processing 902-916 illustrated in FIG. 9.

The following discussion of FIG. 9 explains that the illustrated method 900 supports dependence blocking by setting the speculation bit for Store data written to the cache upon a cache hit. Upon a later attempted access to the same cache line by the non-speculative thread, the speculation bit serves to indicate that the Store data should be blocked from being forwarded to the non-speculative thread. Similarly, store-blocking is supported by the method 900 in that a cache line with the speculation bit set will not be written back to memory.

As stated above, processing for the method 900 begins with the preliminary processing 700 illustrated in FIG. 7. At block 704, index i and tag t are generated in a known fashion. The result for the hit/miss determination is initiated 706 to "empty." Tag array (such as 602, FIG. 60), is indexed by the index i calculated at block 704 in order to locate set s. While our discussion of the method 900 assumes a set associative cache, one skilled in the art will recognized that, for a fully-associative cache scheme rather than a set-associative cache scheme such as that illustrated in FIG. 6, processing of the method 900 may be modified to take the lack of sets into account.

After the appropriate set s is identified at block 708, if the instruction accessing the data cache is a Store from a speculative thread, processing continues at B as illustrated in FIG. 9. FIG. 9 illustrates that, at block 902, a tag comparison is performed. The tag comparison 902 determines whether any way w in set s matches the address for the desired Load instruction from the speculative helper thread. It is also determined whether the safe-store indicator for way w is set. If the tag comparison at block 902 evaluates to "true", a cache hit has occurred and processing proceeds to block 914. At block 914, result is set to way w. Setting 914 result to way w allows speculative Store data to be written to a cache line (way w) that is already associated with speculative data. Processing then ends at block 916.

If the tag comparison at block 902 evaluates to "false," then processing continues at block 904. Block 904 represents a tag comparison that evaluates to "true" if the safe-store indicator for the matching way is not set. If the comparison 904 evaluates to "true," then it is assumed that the speculative Store instruction has hit in the cache, but to a way associated with non-speculative data.

Before writing to the matching cache way, it is determined at block 906 whether the contents of the way had been altered in the cache by the non-speculative thread since it was retrieved from memory. That is, the status of a "dirty" bit for the way is determined at block 906. If the dirty bit is set, then a memory incoherency is exists. Before the contents of the dirty way can be replaced with the new information from the speculative thread write operation, the current contents of the dirty way must be updated to memory. This operation is called a "writeback" operation.

Accordingly, if the dirty bit for way w is determined at block 906 to be set, then a writeback operation is initiated at block 908. After the contents of the dirty way w have been preserved for the writeback operation (by, for instance, copying the contents of the dirty way to a writeback buffer), the safe-store indicator for the way is set at block 908. Then, the result is set to way w at block 914 and processing ends at block 916.

If the dirty bit is determined at block 906 to be clear for way w, then it is known that no change to the contents of way w have occurred since being retrieved from memory. In such case, no incoherency exists. The speculation bit for way w is set at block 912, the result is set to way w at block 914, and processing ends at block 916.

If, however, it is determined that neither tag match 902 nor 904 evaluates to "true," then a miss has occurred. In such case, a way v is allocated for the write operation at block 910. Also at block 910, the speculation bit is set for way v. Result is set 915 to the newly-allocated way v to indicate that the speculative data should be written to the newly-allocated way v. Processing then ends at block 916.

FIG. 9 illustrates additional optional processing 905, 911 that may be performed in an embodiment that utilizes the optional safestores_ht_uid field 607 (FIG. 6) and the SVTC 648 (FIG. 6). FIG. 9 illustrates an alternative embodiment wherein, if tag match 904 evaluates to "false," optional block 905 is executed. At block 905, the safestore victim tag cache 648 (FIG. 6) is consulted to detect whether a speculative-thread-modified cache line has likely been evicted. To do so, the method 900 performs a tag comparison at block 905. The tag comparison 905 determines whether any way x in the SVTC 648 (FIG. 6) matches the address for the desired Load instruction from the speculative helper thread. If the tag is found in the safestore victim tag cache 648 then processing proceeds to block 911. Otherwise, processing proceeds to block 910.

At block 911, a speculation exception is indicated, and processing then ends at block 916. The exception generated at block 911 may be used in the speculative thread context to decide whether the speculative thread should be terminated. Alternatively, the speculation exception may be used in the speculative thread context to trip recovery code that re-executes the Store instruction followed by the speculative Load instruction if the particular Store instruction whose value was evicted can be uniquely identified by the compiler or other mechanism that generated the speculative thread's code.

The foregoing discussion of the method 900 illustrates that for a write-back cache the safe tag is used for the hit comparison, with the result that the speculative Store data will not be written to a valid dirty line associated with non-speculative data until a writeback is generated. One should note that, for a write-through cache, such processing is not necessary and in such embodiments data from a speculative Store instruction may be written to a valid non-speculative cache line.

FIGS. 7 and 10 illustrate a method 1000 of performing hit/miss determination and supporting store blocking for a non-speculative thread's read or write access request to a cache (e.g., 242 in FIG. 6). The method 1000 includes the preliminary processing 700 of FIG. 7 as well as the processing 1002-1018 illustrated in FIG. 10.

As with methods 800 and 900, processing for the method 1000 begins with the preliminary processing 700 illustrated in FIG. 7. At block 704, index i and tag t are generated in a known fashion. The result for the hit/miss determination is initiated 706 to "empty." Tag array (such as 602, FIG. 60), is indexed by the index i calculated at block 704 in order to locate set s. While our discussion of the method 900 assumes a set associative cache, one skilled in the art will recognized that, for a fully-associative cache scheme rather than a set-associative cache scheme such as that illustrated in FIG. 6, processing of the method 1000 may be modified to take the lack of sets into account.

After the appropriate set s is identified at block 708, then processing continues at C, as illustrated in FIG. 10. FIG. 10 illustrates that, at block 1002, it is determined whether a current non-speculative cache line matches the desired memory address. Thus, at block 1002 it is determined whether a way w in set s matches the address of the desired non-speculative thread read or write instruction (such as a Load or Store instruction, respectively) and whether the safe-store indicator for the way w is clear. If so, processing proceeds to block 1016, where result is set to way w. Processing then ends at block 1018. In this manner, a hit has occurred and a non-speculative read or write access may be performed to way w, which is not associated with data from a speculative thread.

If, however, the tag comparison at block 1002 evaluates to "false," then a miss has occurred and processing proceeds to block 1004. Note that a miss has occurred even if there exists a matching regular tag but with the safe-store indicator set. In this manner, a non-speculative Load instruction is prevented from reading any cache line that is associated with speculative data.

A way v in set s is allocated at block 1004 (the allocated way v is referred to herein as the victim). At block 1006 it is determined whether the speculation bit for victim way v is set. If so, then the data in the victim way v that has been changed since the way was retrieved from memory is associated with a speculative thread. In such case, the data is not to be written to memory. Accordingly, if the evaluation at block 1006 evaluates to "true", no writeback is generated for victim way v. Instead, the safe-store indicator for victim way v is cleared 1012, the result is set 1016 to victim way v, and a request is made 1017 to the memory hierarchy to bring a copy of the line currently being accessed into the cache. In this manner, Store data from a non-speculative thread instruction overrides a previously speculatively-written cache line, and store blocking is performed. Processing then ends at block 1018.

One should note that, for at least one alternative embodiment, method 1000 is modified such that a non-speculative Store instruction may hit to a previously speculatively-written cache line. That is, if the tag comparison at block 1002 utilizes a regular tag instead of a safe tag, then a hit for a non-speculative Store instruction will be registered even for those ways whose safe-store indicator set. In such case, the safe-store indicator is cleared to indicate that the identified way w is now associated with data from a non-speculative thread. For such embodiment the way must is refreshed with a clean version of the line from memory before placing the store data into the line.

If it is determined at block 1006 that the victim way v's safe-store indicator is not set, then the victim way w may be associated with data updates that have been performed by the non-speculative thread. Accordingly, it is determined at block 1010 whether victim way v's dirty bit is set. If not, then victim way w's safe-store indicator remains cleared, result is set to victim way w at block 1014, and processing ends at block 1018.

However, if it is determined at block 1010 that the dirty bit for victim way v is set, then the victim way v has been updated with non-speculative data since it was retrieved from memory. Accordingly, a writeback should be performed before the victim way v is modified by the current non-speculative write access. Accordingly, at block 1008 a writeback is generated. Result is assigned to victim way v at block 1014, and processing ends at block 1018.

The methods and apparatuses discussed above may be used to implement dependence blocking and store-blocking schemes to allow speculative helper threads to execute Store instructions without the hardware overhead of category 1 techniques. Such schemes allow broad application of helper threads for effective prefetch for both instruction and data caches by honoring and supporting Store-induced dependency in a speculative helper thread in a way that does not affect a non-speculative thread's correctness.

For at least one embodiment a store from the non-speculative thread in the MOB 223 (FIG. 2) may not be seen by a later load instruction from a speculative thread. For such embodiment, it is assumed that, were this store's value to be critical to the operation of the speculative thread, it would be included in the code for the speculative thread. For at least one alternative embodiment, the control logic 475 of the MOB may contain additional logic (not shown) to mimic the tag match logic for the data cache to enable Store-to-Load bypassing from the non-speculative thread to the speculative thread.

By way of further illustrating the advantages of a providing a dependence blocking and store blocking hardware and methods as described above in connection with FIGS. 1-10, we further discuss the two specific situations mentioned above: 1) tracking the run-time mutation of dynamic data structures for data prefetch, and 2) tracking control flow for instruction pre-fetch.

Regarding the first situation, run-time data structure mutations, consider a linked data structure. For some applications, the linked data structure being traversed by an application can also be mutated. The mutated value (such as a new pointer value) should be stored to memory in order to comprehend the data structure mutation. However, in category 2 techniques, such storage does not occur. The result is that the helper thread, which performs Load instructions but not Store instructions, is unable to comprehend the data structure mutation and can stray from the access streams that will be performed by the main thread. If such straying occurs, the prefetch by the mutation-less helper thread is not beneficial to the main thread.

As an example, consider the code excerpt set forth in Table 1. The while loop in the code excerpt suffers a significant number of cache misses for load instructions (in the machine code).

TABLE 1

```
1.  while (rr_node_route_inf[i.node].target_flag ==0) {
2.      pcost = rr_node_route_inf[inode].pat_cost;
3.      new_pcost = current -> cost;
4.      if (pcost > new_pcost) { /* New path is lowest cost */
5.          rr_node_rout_inf[inode].pat_cost = new_pcost;
6.          prev_node = current -> u.prev_node;
7.          rr_node_route_inf[inode].prev_node = prev_node
8.          rr_node_route_inf[inode].prev_edge = current ->
                prev_edge;
9.      if (pcost > 0.99 * HUGE_FLOAT) /* First time touched */
10.             add_to_mod_list (&rr_node_route_inf[inode].pat_
                cost);
11.     expand_neighbours (inode, new_pcost, inet, bend_cost); }
12.  free_heap_data(current);
13.  do {
14.     current = heap[1]; /* Smallest element */
15.     heap[1] = heap[heap_tail];
16.     while (ito < heap[heap_tail];
17.         temp_ptr = heap[ito];
18.         heap[ito] = heap[ifrom];
19.         heap[ifrom] = temp_ptr;
20.         ifrom = ito;
21.         ito = 2*ifrom;
22.     }
23.  } while (current -> index == OPEN); /* get another one if invalid
         entry *?
24.  inode = current -> index; }
```

In Table 1, the while loop at rows 16-22 represent a circuit routing routine. Because a significant number of cache misses occur during the machine load instructions associated with the circuit routing routine, it would be advantageous to speculatively pre-execute the code in a helper thread so that the data for the load instructions can be prefetched into the data cache. Ideally, then, the helper thread would pre-execute the code at rows 1, 13, 14, 16, 17, 18, 19, 20, 21, 22, 23 and 24 in order to comprehend the data structure mutation and warm up the data cache for the main thread.

Issues arise, however, if the heap is a shared memory structure that is not partitioned among thread contexts. In other words, if all threads access the same heap structure in memory, update to an address in the shared structure by the helper thread may seriously compromise the correctness of the non-speculative thread if the non-speculative thread accesses the updated information that was speculatively stored at the address.

To avoid "corrupting" the non-speculative thread's data structure (the representation of which is stored in the heap), traditional category 2 techniques would discard those instructions from the helper thread that involve a machine-level Store instruction that update the non-speculative thread's architectural memory states (e.g. pointers to the heap). Accordingly, a category 2 technique would likely include only instructions 1, 13, 14, 23 and 24 in the helper thread. By excluding the instructions in the body of the while loop (at lines 16-22), Store instructions are avoided. However, the helper thread remains ignorant of the mutations in the data structure that may have occurred at lines 16-22 (if such lines had been executed by the main thread). Accordingly, a helper thread generated according to a traditional category 2 technique may well fail to achieve effective data prefetch if data structure permutation happens frequently. Safe-store techniques as disclosed herein, however, may allow the helper thread to execute Store instructions for pointer updates, thus enabling tracking of data structure mutation and generating highly accurate prefetches for the dynamic data structure.

Figure 11:
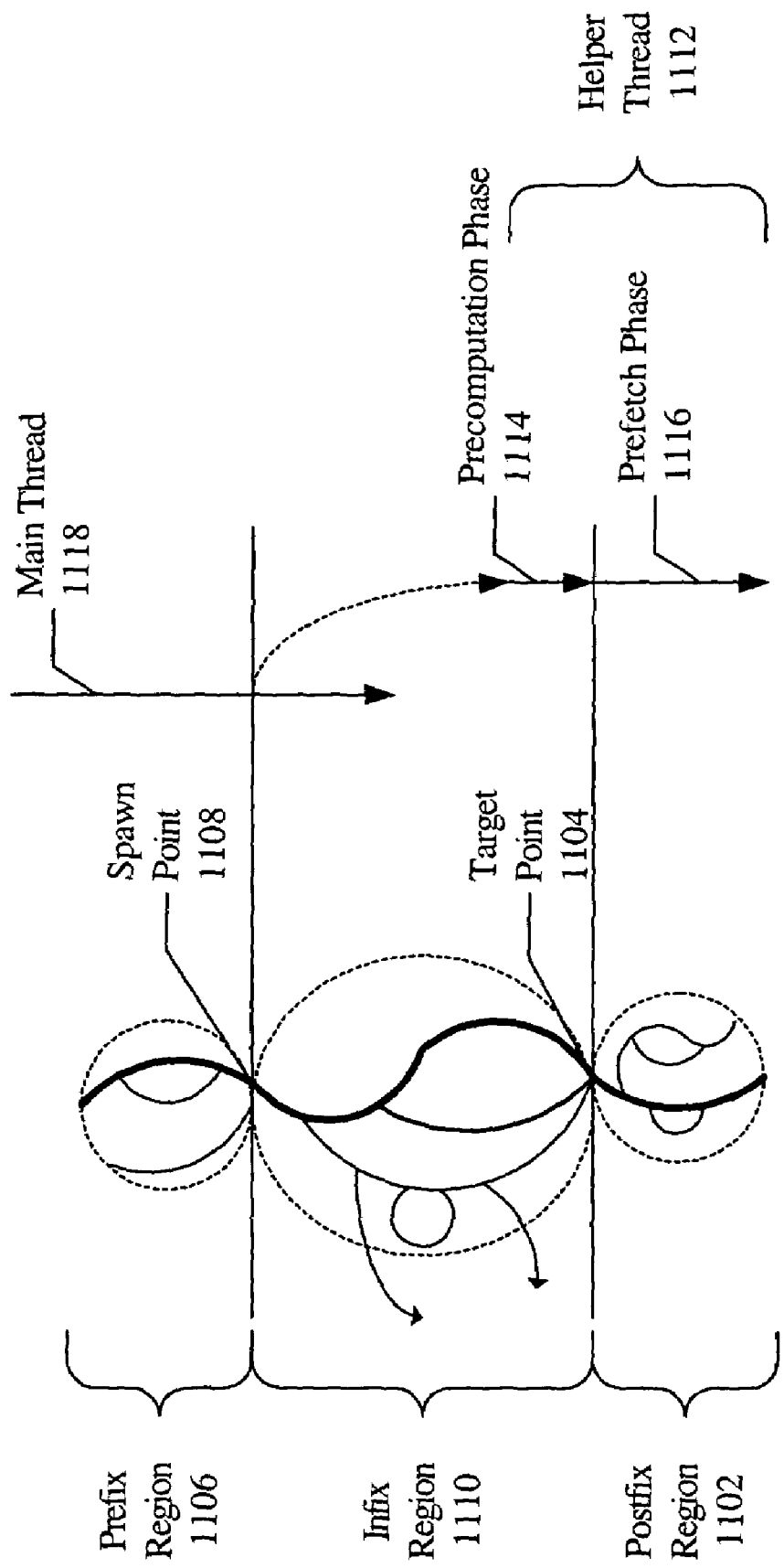
FIG. 11 is a diagram representing an illustrative main thread program fragment containing three distinct control-flow regions.

For a further discussion of the second situation, tracking control flow for instruction prefetch, we refer to FIG. 11. Regarding control flow for instruction prefetch, Store instructions may allow the helper thread to accurately follow branch instructions. To illustrate this concept, a brief description of a particular method of instruction prefetch follows. One skilled in the art will recognize, however, that the embodiments described herein may be used in conjunction with any known instruction prefetch technique. For any of these techniques, speculative thread execution of Store instructions may be desirable.

As the discussion in the following paragraphs makes clear, instruction prefetch presents a situation wherein the execution of Store instructions in the speculative prefetch thread is useful. For certain embodiments of instruction prefetching, one or more speculative helper threads pre-execute a selected portion of a main thread program. The selected portion of the main thread program is selected based upon a determination that it is likely to soon be executed by the main thread. Accordingly, a side effect of the helper thread's pre-execution is that the instructions of the selected portion of code have been pre-fetched into an instruction (or trace) cache by the time the main thread executes the selected code portion.

A diagram representing an illustrative main thread 1118 program fragment containing three distinct control-flow regions is illustrated in FIG. 11. In the illustrated example, a postfix region 1102 following a target point 1104 is predicted to suffer heavy performance loss due to instruction cache misses. For simplicity in explanation, a region 106 before a spawn point 1108 is called the prefix region 1106, and a region 1110 between the spawn point 108 and target point 104 is called the infix region 1110.

Effective instruction prefetch benefits from the helper thread's 1112 accurate resolution of branches in the postfix region 1102. Accordingly, a helper thread 1112 may include two phases of execution. Specifically, the helper thread 1112 execution may include a precomputation phase 1114 and a prefetch phase 1116. During the precomputation phase 1114, the helper thread 1112 determines one or more live-in values in the infix region 1110 before starting to execute the prefetch phase 116 in the postfix region 1102. The instructions executed by the helper thread 1112 during the precomputation phase 1114 correspond to a subset (referred to as a "backward slice") of instructions from the main thread in the infix region 1110 that fall between the spawn point 108 and the target point 1104. This subset may include instructions to calculate data values upon which conditional branch instructions in the postfix region 1102 depend. During the prefetch phase 1116, the helper thread 1112 executes code in the postfix region 1102, which is an intact portion of the main thread's original code. In most cases, the postfix region 1102 includes Store instructions. Execution of code in the prefetch phase 1116 both resolves control flow for the helper thread 1112 in the postfix region 1102 and prefetches instructions for the main thread 1118.

During both the precomputation phase 1114 and the prefetch phase 1116, the helper thread 1112 would ideally execute Store instructions involved in computing values upon which branch instructions in the postfix region 1102 depend. That is, code for the main thread 1118 may include Store instructions that are ignored during helper thread 1112 execution according to category 2 techniques. These discarded Store instructions may include instructions on which branch instructions in the postfix region 1102 (and that are to be executed by the helper thread 1112 during the prefetch phase 1116) depend. In order for the helper thread 1112 to correctly probe control in the post-fix region 1102 during the prefetch phase 1116, the helper thread 1112 should observe the necessary Store-Load dependencies. Failure to do so during speculative pre-execution could result that the helper thread strays off the course of the correct future execution path of the main thread 1118. In such case, the instructions prefetched by the helper thread 1112 during the prefetch phase 1116 may not be useful to the main thread 1118. The Store instructions in the postfix region 1102 are part of the main thread's original code. Accordingly, unlike the precomputation phase 1114, Store instructions are not easily excluded statically.

The foregoing discussion describes selected embodiments of methods and apparatuses for performing Store instructions in a speculative helper thread without interfering with the correctness of a non-speculative thread. At least one embodiment of the apparatus contains mechanisms for blocking the storage of speculative Store data to memory and also for blocking the forwarding of Store data from a speculative thread to a Load instruction in the non-speculative thread.

At least one embodiment of the apparatus discussed herein includes logic that marks a Store instruction and its associated data in a data cache and/or MOB as "speculative." Such logic may be implemented in a sequencer. The apparatus may also include a store blocking mechanism, such as store blocker logic 246 illustrated in FIG. 1, which prevents speculative Store data from being committed to memory. Such logic may be included within a memory system and/or may be implemented as a circuit of the MOB.

At least one embodiment of the apparatus discussed herein may include a dependence blocking mechanism, such as dependence blocker logic 236 illustrated in FIG. 1, to prevent speculative Store data from being bypassed to Load instructions of a non-speculative thread. Such logic may be implemented as a circuit of the MOB and/or may be included within a memory system.

In the preceding description, various aspects of methods and apparatuses have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

Embodiments of the method may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the method described herein is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Examples of such processing systems are shown in FIGS. 1, 2 and 6. Sample systems 100, 200, 600 may be used, for example, to execute the processing for methods of store blocking and dependence blocking, such as the embodiments described herein. Sample systems 100, 200, 600 are representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, personal digital assistants and other hand-held devices, set-top boxes and the like) may also be used. In one embodiment, sample systems 100, 200, 600 may be executing a version of the Windows™ operating system available from Microsoft Corporation, although other operating systems and graphical user interfaces, for example, may also be used.

Referring to FIGS. 1, 2, and 6, sample processing systems 100, 200, 600 include a memory system 102 and a processor 104. Memory system 102 may store instructions 110 and data 112 for controlling the operation of the processor 104.

Memory system 102 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 102 may store instructions 110 and/or data 112 represented by data signals that may be executed by processor 104. The instructions 110 and/or data 112 may include code for performing any or all of the techniques discussed herein.

While particular embodiments of the present invention have been shown and described, it will be obvious to those skilled in the art that changes and modifications can be made without departing from the present invention in its broader aspects. For example, the store blocker logic 246 and dependence blocker logic 236 discussed above may be implemented in a multiprocessing system such as the system 1200 illustrated in FIG. 12.

For such embodiment, the processor 104$a$ that executes the main thread is referred to as a main processor, or main core, and the processor 104$i$, ($i$=b . . . n), that executes the helper thread is referred to as the helper processor, or helper core. For at least one embodiment, the processors 104$a$-104$n$ of system 1200 include store blocker logic 236 and store blocker logic 246 (see FIG. 1). Accordingly, local store and load dependencies are observed in the private caches 1230 of the processors 104$a$-104$n$, while Store instructions from a helper core are not observed outside the helper core.

For at least one alternative embodiment, the effects of a Store instruction executed by one processor are exposed to other processors of the system 1200. For such embodiment, the effects may be exposed to only a subset of the processors 104a-104n. Such subset is sometimes referred to as an affinity group. By exposing the effects of a Store instruction to peer processors in an affinity group certain advantages may be achieved. For instance, a safestore on a common address may be used effectively by one helper thread to terminate another helper thread that would have otherwise likely run astray on a stale data structure.

For at least one embodiment that implement the store blocker logic 246 and dependence blocker logic 236 in a multiprocessor system 1200, the coherence protocol utilized among the processors 104a-104n, such as a modified-exclusive-shared-invalid (MESI) protocol, may be augmented to include a safe-store indicator field similar to field 606 illustrated in FIG. 6. A "true" value in this multiprocessor safe-store indicator field may effectively impose an "exclusive" state for the information among the helper core(s) of an affinity group.

For at least one such embodiment, dependence blocker logic 236 in a multiprocessor system such as system 1200 marks a helper core's local copy of store data as exclusive with the safe-store indicator field set to a "true" value while marking the data invalid for other helper cores. Dependence blocker logic 236, while allowing such data to be forwarded to load instructions from other helper threads, prevents the data from being forwarded to the non-speculative thread running on the main core.

For at least one embodiment, store blocker logic 246 in a multiprocessor system such as system 1200 prevents speculative store data from a helper thread from being written back to memory. When a cache line that includes speculative store data from a helper thread is displaced, it is not written back into a higher level cache that does not support store blocking. Similarly, store blocker logic 246 prevents such speculative store data from being written to off-chip memory 1260.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. An apparatus comprising:
a processor including:
marking logic to mark a first speculation identifier associated with a speculative store instruction of a speculative thread as speculative; and
blocker logic to prevent data associated with the speculative store instruction of the speculative thread from being forwarded to a non-speculative instruction of a non-speculative thread based on a first address associated with the speculative store instruction and the first speculation identifier in comparison to a second address associated with the non-speculative store instruction and a second speculation identifier associated with the non-speculative instruction and in response to a first speculation identifier not matching a second speculation identifier.

2. The apparatus of claim 1, wherein: blocker logic is further to allow the data associated with a store instruction of the speculative thread to be forwarded to an instruction of a second speculative thread.

3. The apparatus of claim 1, further comprising: a store request buffer, a store request buffer entry of the store request buffer including a speculation identifier field to hold the first speculation identifier to indicate the speculative store instruction is speculative and an address field to hold the first address.

4. The apparatus of claim 3, wherein the second speculation identifier is to indicate the non-speculative instruction is non-speculative, and wherein blocker logic to prevent data associated with the speculative store instruction from being forwarded to the non-speculative instruction based on a first address associated with the speculative store instruction and the first speculation identifier in comparison to a second address associated with the non-speculative store instruction and a second speculation identifier associated with the non-speculative instruction comprises the blocker logic to compare a first combination of the first address and the first speculation identifier with a second combination of the second address and the second speculation identifier and to determine the first combination is different from the second combination based on the first speculation identifier and the second speculation identifier being different.

5. The apparatus of claim 1, wherein blocker logic further includes:
dependence blocker logic to prevent the data associated with the speculative store instruction from being forwarded to the non-speculative instruction of the non-speculative thread; and
store blocker logic to prevent the data from being stored in a memory system.

6. The apparatus of claim 5, wherein: store blocker logic is outside an execution pipeline.

7. The apparatus of claim 5, wherein: dependence blocker logic is included in an execution pipeline.

8. The apparatus of claim 7, wherein: dependence blocker logic is included in a memory ordering buffer of the processor.

9. A system, comprising:
a memory system that includes a memory device; and
a processor associated with the memory system, the processor including dependence blocker logic to prevent data associated with a store instruction of a speculative thread from being forwarded to a non-speculative instruction of a non-speculative thread in response to a first speculation identifier associated with the store instruction not matching a second speculation identifier associated with the non-speculative instruction based on a first address associated with the speculative store instruction and the first speculation identifier in comparison to a second address associated with the non-speculative instruction and the second speculation identifier associated with the non-speculative instruction and to allow the data associated with the store instruction of the speculative thread to be forwarded to a speculative instruction of another speculative thread in response to the first speculation identifier matching a third speculation identifier associated with the speculative instruction.

10. The system of claim 9, wherein: the processor further includes store blocker logic to prevent the data from being stored in the memory system and marking logic to mark the first and the third speculation identifiers as speculative.

11. The system of claim 10, wherein: the first, second, and third speculation identifiers (IDs) include safe speculation domain IDs.

12. The system of claim 11, wherein: the first safe speculation domain ID includes a first thread identifier to identify the speculative thread associated with the store instruction, the second safe speculation domain ID includes a second thread identifier to identify the non-speculative thread associated with the non-speculative instruction, and the third safe speculation domain ID includes a third thread identifier to identify the another speculative thread associated with the speculative instruction.

13. The system of claim 10, further comprising: a store request buffer to store the first speculation ID.

14. The system of claim 9, wherein: the processor includes a first logical processor to execute the non-speculative thread, a second logical processor to execute the speculative thread, and a third logical processor to execute the another speculative thread.

15. The system of claim 9, further comprising: a second processor wherein the processor is to execute the non-speculative thread, the second processor is to execute the speculative thread, and the second processor is to execution the another speculative thread.

16. The system of claim of claim 9, wherein: the memory system includes store blocker logic to prevent the data from being stored in the memory system in response to a first speculation identifier associated with the store instruction not matching a second speculation identifier associated with the non-speculative instruction and a cache organized to include a plurality of tag lines, wherein each tag line of the cache includes a unique helper thread ID field.

17. The system of claim 9, wherein: the memory system includes a cache organized to include a plurality of tag lines, wherein each tag line of the cache includes a safe-store indicator field.

18. The system of claim 9, wherein: the memory system includes a victim tag cache to indicate evicted cache lines that include speculative load data.

19. A method, comprising:
receiving instruction information for a load instruction, the instruction information including a load address;
performing a dependence check, wherein performing the dependence check includes:
determining if a store address of an in-flight store instruction matches the load address; and
determining if the load instruction and the in-flight store instruction each originate with a speculative thread based on a first speculation identifier associated with the in-flight store instruction and a second speculation identifier associated with the load instruction;
determining the dependence check is successful in response to determining the store address matches the load address and determining the load instruction and the in-flight store instruction each originate with a speculative thread;
forwarding, if the dependence check is successful, store data associated with the in-flight store instruction to the load instruction; and
declining to forward the store data to the load instruction, if the dependence check is not successful in response to a first speculation identifier not matching a second speculation identifier.

20. The method of claim 19, wherein performing the dependence check further comprises: determining if the in-flight store instruction and the load instruction originate from the same thread.

21. The method of claim 20, wherein determining if the in-flight store instruction and the load instruction originate from the same thread further comprises:
determining if a thread ID included in the first speculation identifier matches a thread ID included in the second speculation identifier.

22. The method of claim 19, wherein performing the dependence check further comprises: if the load instruction and the in-flight store instruction do not each originate with a speculative thread, determining if the load instruction and the in-flight store instruction each originate with a non-speculative thread.

23. The method of claim 19, further wherein: declining to forward further comprises declining to forward the store data to the load instruction if (the load instruction and the in-flight store instruction each originate with a speculative thread) AND (the in-flight store instruction originates with a speculative thread that is not older in program order than the speculative thread from which the load instruction originates).

24. An apparatus comprising:
a processor including:
a first logical processor to execute a speculative thread;
a second logical processor to execute a non-speculative thread;
a storage area to include a speculation identifier (ID) field, the speculation ID field to hold a first value to indicate an associated store instruction is associated with the speculative thread; and
control logic to prevent data associated with the store instruction from being consumed by the non-speculative thread, based on the speculation ID holding the first value, wherein: the control logic includes comparison logic to compare a second address and a second ID value, which are associated with a load instruction that is to be executed as part of the non- speculative thread on the second logical processor, with the first address and the first ID value: and store blocker logic to prevent data associated with the store instruction from being consumed by the load instruction that is to be executed as part of the non-speculative thread, in response to the first ID value and the first address not matching the second ID value and the second address.

25. The apparatus of claim 24, wherein: the first and the second logical processors are the same logical processor, and wherein the non-speculative thread and the speculative thread are to be time multiplexed for execution on the same logical processor.

26. The apparatus of claim 24, wherein: the storage area includes a store buffer, and wherein the speculation ID field is included within a store buffer entry of the store buffer, the store buffer entry to also hold a first address associated with the store instruction and the data associated with the store instruction.

27. The apparatus of claim 26, wherein: the first value is to include a first identifier (ID) value associated with the first logical processor.

28. The apparatus of claim 24, wherein: the processor further includes a third logical processor to execute an additional speculative thread, and wherein the control logic is to allow data associated with the store instruction from being consumed by the additional speculative thread.

29. The apparatus of claim 24, wherein: the first value is to include a 1-bit mode value.

30. The apparatus of claim 24, wherein: the processor further includes marking logic to set the speculation ID field to the first value in response to detecting the store instruction associated with the speculative thread.

* * * * *

UNITED STATES PATENT AND TRADEMARK OFFICE
CERTIFICATE OF CORRECTION

| | | |
|---|---|---|
| PATENT NO. | : 7,657,880 B2 | Page 1 of 1 |
| APPLICATION NO. | : 10/633012 | |
| DATED | : February 2, 2010 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1673 days.

Signed and Sealed this

Twenty-eighth Day of December, 2010

David J. Kappos
*Director of the United States Patent and Trademark Office*